US008635539B2

(12) United States Patent
Young et al.

(10) Patent No.: US 8,635,539 B2
(45) Date of Patent: Jan. 21, 2014

(54) WEB-BASED LANGUAGE TRANSLATION MEMORY COMPILATION AND APPLICATION

(75) Inventors: Marc Young, Seattle, WA (US); Molly Bostic, Seattle, WA (US); John Mollman, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1058 days.

(21) Appl. No.: 12/262,309

(22) Filed: Oct. 31, 2008

(65) Prior Publication Data

US 2010/0115424 A1     May 6, 2010

(51) Int. Cl.
*G06F 3/048*     (2013.01)
*G06F 15/16*     (2013.01)

(52) U.S. Cl.
USPC .................. 715/753; 715/751; 704/2; 704/1

(58) Field of Classification Search
USPC ....................................... 715/753, 751; 704/2
See application file for complete search history.

(56) References Cited

U.S. PATENT DOCUMENTS

| | | |
|---|---|---|
| 6,278,969 B1 | 8/2001 | King et al. |
| 6,535,842 B1 | 3/2003 | Roche et al. |
| 6,598,015 B1 * | 7/2003 | Peterson et al. .................. 704/3 |
| 7,110,938 B1 | 9/2006 | Cheng et al. |
| 7,536,294 B1 * | 5/2009 | Stanz et al. ........................ 704/3 |
| 2002/0111787 A1 * | 8/2002 | Knyphausen et al. ............. 704/2 |
| 2002/0124109 A1 * | 9/2002 | Brown .......................... 709/246 |
| 2003/0004702 A1 | 1/2003 | Higinbotham |
| 2003/0009322 A1 | 1/2003 | Marcu |
| 2003/0040900 A1 * | 2/2003 | D'Agostini ....................... 704/2 |
| 2005/0076342 A1 | 4/2005 | Levins et al. |
| 2006/0136223 A1 * | 6/2006 | Brun et al. ..................... 704/277 |
| 2008/0120087 A1 | 5/2008 | Scanlan |
| 2008/0162114 A1 | 7/2008 | Torres-Rocca et al. |
| 2009/0076792 A1 * | 3/2009 | Lawson-Tancred .............. 704/2 |
| 2009/0106017 A1 * | 4/2009 | D'Agostini ....................... 704/3 |
| 2009/0217196 A1 * | 8/2009 | Neff et al. ..................... 715/799 |

OTHER PUBLICATIONS

"Multilingualism on the Web (1999)", retrieved at <<http://www.etudes-francaises.net/entretiens/multieng4.htm>>, Aug. 7, 2008, pp. 9.

"Machine Translation Tools vs. Translation Memory Tools", retrieved at <<https://www.illinoistech.org/technologynews.aspx/678>>, Aug. 7, 2008, pp. 3.

"Google Summer of Code 2008—Ideas", retrieved at <<http://translate.sourceforge.net/wiki/developers/gsoc2008_ideas, Aug. 7, 2008, pp. 12.

"Sharing Translation Memory Data Aligned from Third-Party Documents: Legal Considerations", retrieved at <<http://www.tm-marketplace.com/whitepapers/align.pdf, pp. 3.

"Wiki-Translation—Relevant Sites and Resources", retrieved at <<http://wiki-translation.com/tiki-index.php?page=Relevant+sites+and+resources>>, Sep. 18, 2008, pp. 6.

* cited by examiner

*Primary Examiner* — Daeho Song

(57) ABSTRACT

Suggested edits to translated text are enabled to be provided by users. The suggested edits are associated with the translated text in a content database. A subsequent user may view the translated text and any associated suggested edits. The subsequent user may be enabled to approve a suggested edit to the translated text. The translated text is enabled to be displayed as modified according to the approved suggested edit. This may include enabling multiple instances of the translated text to be displayed as modified according to the suggested edit if the translated text occurs multiple times (e.g., appears multiple times in one or more documents) in the content database. Further users that attempt to view the translated text in a document of the content database will be provided with the modified version of the translated text.

20 Claims, 20 Drawing Sheets

100

200

1702 —
associate the received suggested edit with a plurality of instances of the second-language text segment contained in one or more second-language documents stored in the database

FIG. 17

1802 —
enable each instance of the segment of second-language text in the one or more second-language documents containing an instance of the segment to be displayed as modified according to the suggested edit

1902
generate a plurality of identifiers, each identifier being associated with each instance of a corresponding segment of first-language text that is present in at least one of the plurality of first-language documents 1904
associate each identifier with each instance of a corresponding segment of second-language text that is present in at least one of the plurality of second-language documents and that is a translated version of the corresponding segment of first-language text 1906
determine the identifier associated with the segment of second-language text of the second-language document having the suggested edit 1908
associate the suggested edit with each segment of second-language text associated with the determined identifier in the plurality of second-language documents 1910
enable each segment of second-language text associated with the determined identifier in the plurality of second-language documents to be displayed as modified according to the suggested edit

FIG. 19

WEB-BASED LANGUAGE TRANSLATION MEMORY COMPILATION AND APPLICATION

BACKGROUND

A translation may be performed to interpret the meaning of text from a first language to a second language. A translation is not a simple word-for-word correspondence between any two languages. For a translation to be useful, the translation should take into account constraints such as context, the rules of grammar of the first and second languages, and writing conventions and idioms of the first and second languages.

Machine translation (MT) is a machine-based technique for generating translations. For example, a computer-based translation program may analyze a source text and generate a target text without further human intervention. Machine-based translations are often combined with human intervention, however, in the form of pre-editing and/or post-editing, to improve translation accuracy.

A translation memory is a database of translations that is designed to aid human translators. Translation memories are typically used in conjunction with a dedicated computer assisted translation (CAT) tool, a word processing program or other editor, terminology management systems, multilingual dictionaries, or even raw machine translation output. A translation memory includes text segments in a source language and their translations into one or more target languages. A text segment can be a block, paragraph, sentence, phrase, or other segment of text. Translation memories are commonly used on translation projects to leverage work and improve consistency across the content being translated.

Some machine translation tools enable human users to generate corrections to machine translated text. The generated corrections may be stored and used for future translation engine training. However, the generated corrections are not viewable to other users of the machine translation tool. An example of such a machine translation tool that is accessible via the Internet is translate.google.com (for beta languages only), which is published by Google Inc. of Mountain View, Calif.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Suggested edits to translated text are enabled to be provided by users. The suggested edits are associated with the translated text in a content database. A subsequent user may view the translated text and any associated suggested edits. The subsequent user may be enabled to approve a suggested edit to the translated text. The translated text appears modified to the user according to the approved suggested edit. This may include enabling multiple instances of the translated text to appear to be modified according to the suggested edit if the translated text occurs multiple times (e.g., appears multiple times in one or more documents) in the content database. Further users that attempt to view the translated text in a document of the content database will be provided with the edited version of the translated text.

Methods for enabling edits to translated text are described. In one method, a first request from a first device for a second-language document stored in a database is received, where the second-language document is a translated version of a first-language document. The second-language document is transmitted to the first device in response to the first request. A first user at the first device is enabled to generate a suggested edit to a segment of second-language text of the second-language document. The suggested edit is received from the first device. The received suggested edit is associated with the segment of second-language text of the second-language document stored in the database.

In a further implementation of the method, a second request from a second device may be received for the second-language document stored in the database. The second-language document may be transmitted to the second device in response to the second request. A second user at the second device may be enabled to interact with the segment of second-language text of the second-language document to display the suggested edit. The second user is enabled to approve the displayed suggested edit. An indication of the approval of the suggested edit is received from the second device. The segment of second-language text of the second-language document stored in the database is enabled to be displayed in a manner such that the segment of second-language text appears to be modified according to the suggested edit. For instance, each time the segment of second-language text of the second-language document is subsequently viewed, the suggested edit may be displayed in place of the segment of second-language text (e.g., the segment of second-language text is modified according to the suggested edit at rendering time). Alternatively, the second-language document stored in the database may be modified by revising the segment of second-language text of the second-language document according to the suggested edit.

Systems for enabling edits to translated text are also described. For instance, in one implementation, a document server includes a document request handler, a suggestion receiver module, and a suggestion approver module. The document request handler is configured to receive requests from devices for a second-language document stored in a database. The second-language document is a translated version of a first-language document. The document request handler is configured to transmit the second-language document to requesting devices in response to the request. The suggestion receiver module is configured to receive a suggested edit to a segment of second-language text of the second-language document from a first device, and to associate the received suggested edit with the segment of second-language text of the second-language document stored in the database. A user at a second device may be enabled to interact with the segment of second-language text of the second-language document to display the suggested edit, and to approve the displayed suggested edit. The suggestion approver module is configured to receive an indication of the approval of the suggested edit from the second device, and to enable the segment of second-language text of the second-language document to appear to be modified according to the suggested edit during subsequent attempts to display the second-language text.

In another method, a first request is received from a first device for a second-language document stored in a database, the second-language document being a translated version of a first-language document. The second-language document is transmitted to the first device in response to the first request. A suggested edit to a segment of second-language text of the second-language document is received from the first device. An identifier associated with the segment of second-language text of the second-language document having the suggested edit is identified. The suggested edit is associated with each segment of second-language text associated with the determined identifier in a plurality of second-language documents stored in the database.

In a further implementation of the method, a second request is received from a second device for one of the plurality of second-language documents stored in the database. The one of the plurality of second-language documents is transmitted to the second device in response to the second request. An indication of the approval of the suggested edit is received from the second device. Each segment of second-language text associated with the determined identifier in the plurality of second-language documents may be subsequently displayed in a manner such that the segment of second-language text appears to be revised according to the suggested edit. For instance, each of the plurality of second-language documents may be modified according to the suggested edit, or the suggested edit may be imparted on the segment of second-language text for each of the second-language documents at the time of display.

Computer program products are also described herein that enable edits to translated text as described herein.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

Figure 2:
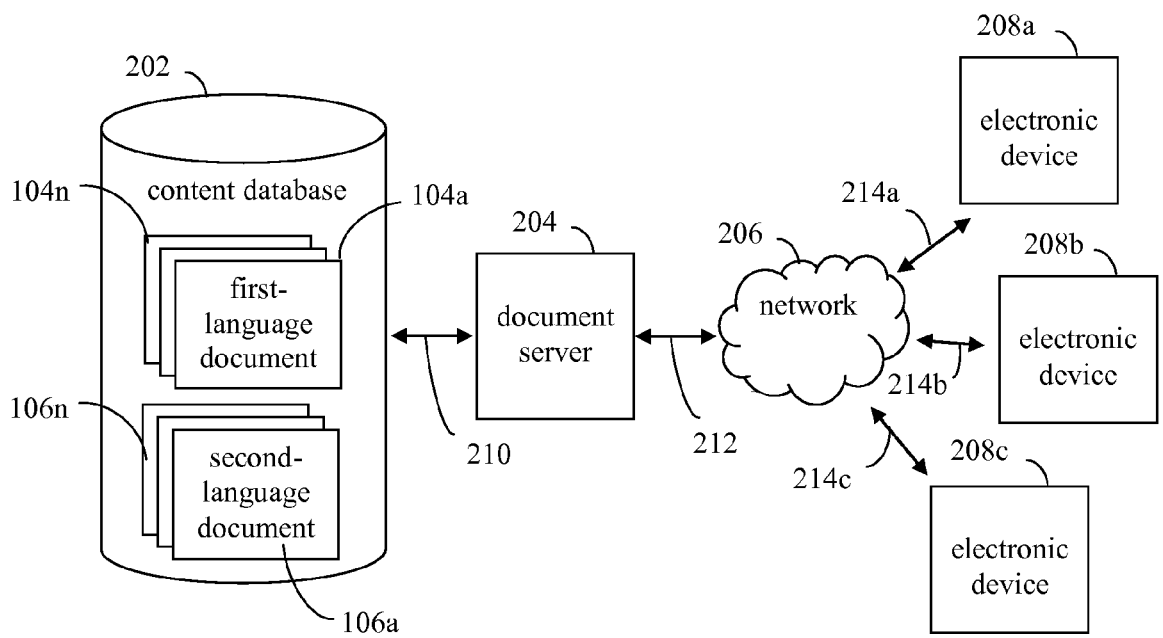
FIG. 2 shows a block diagram of a translation memory system, according to an example embodiment.
Figure 5:
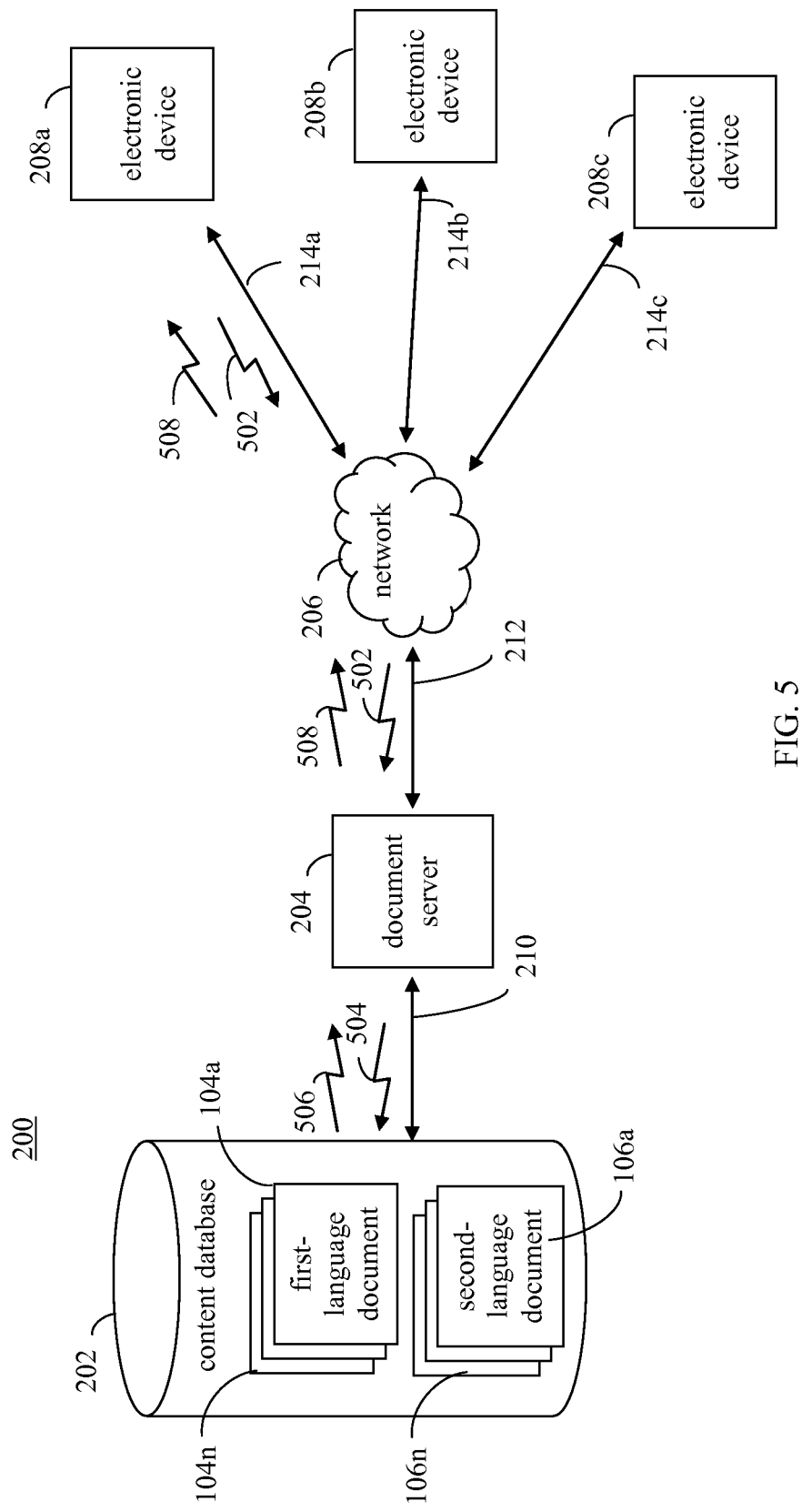
Figure 11:
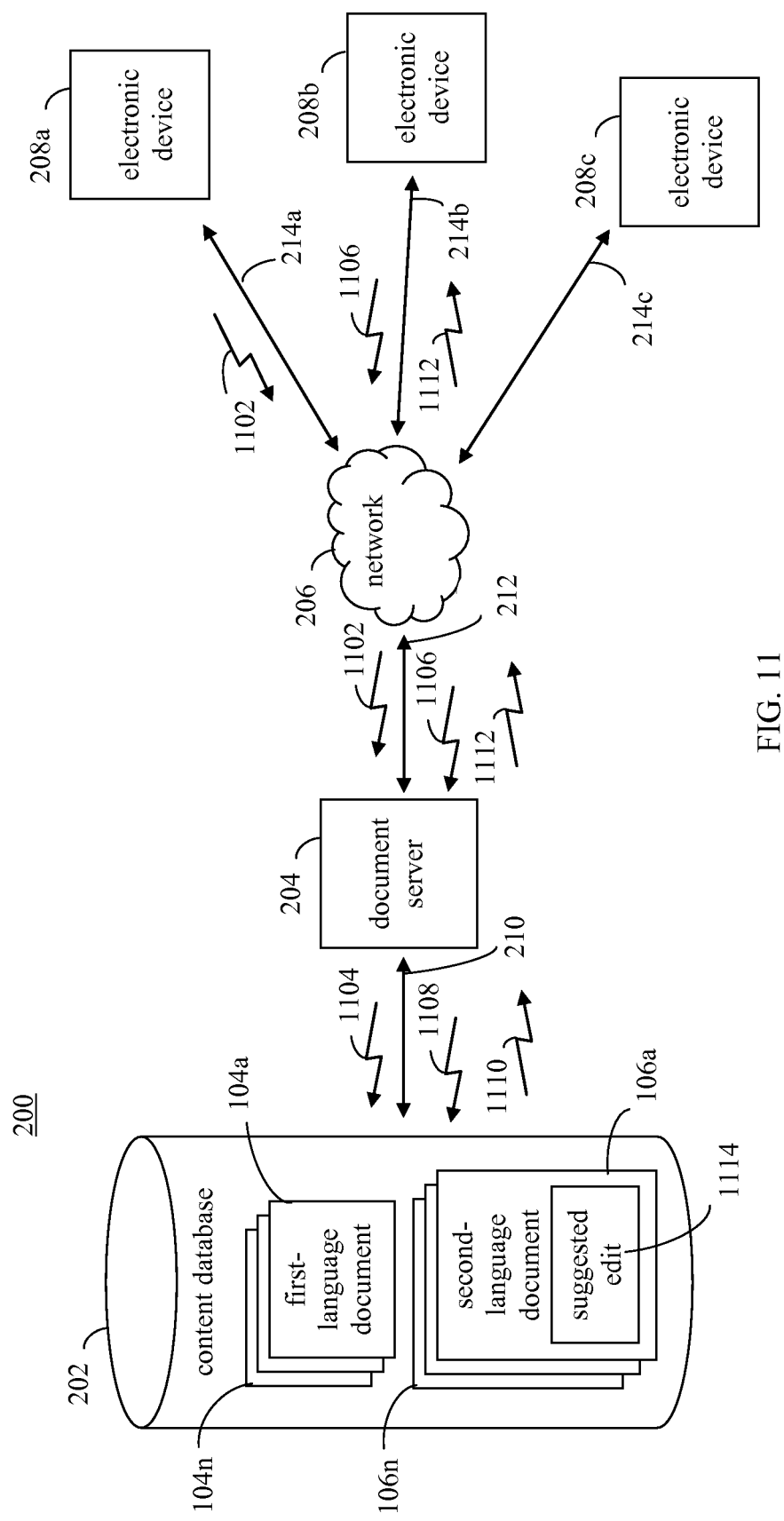
Figure 16:
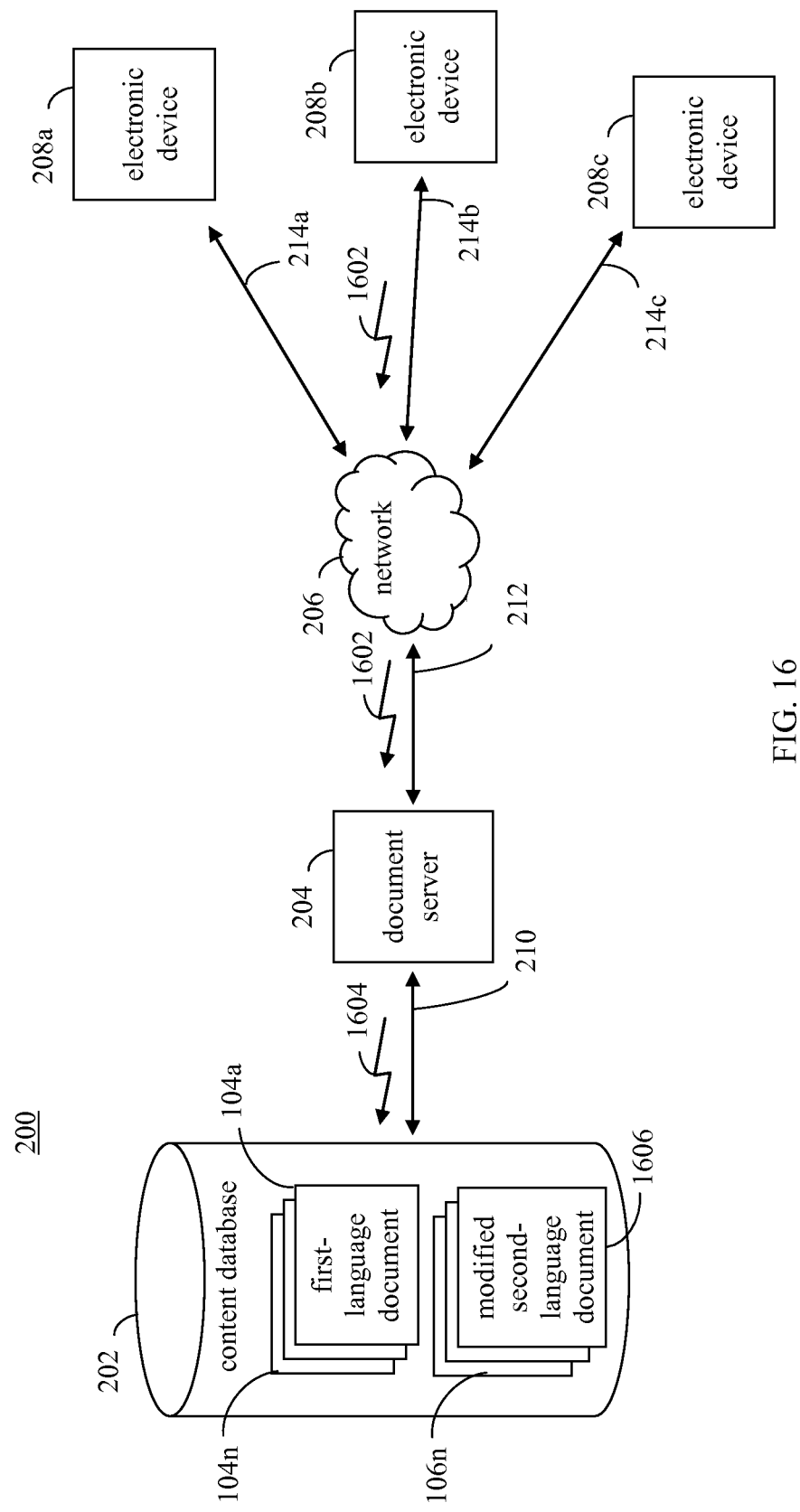

FIGS. 5, 11, and 16 show examples of communications occurring in the translation memory system of FIG. 2, according to embodiments.

FIGS. 6-10 and 13-15 show block diagrams of examples of user interfaces that may be provided at an electronic device, according to embodiments.

Figure 12:
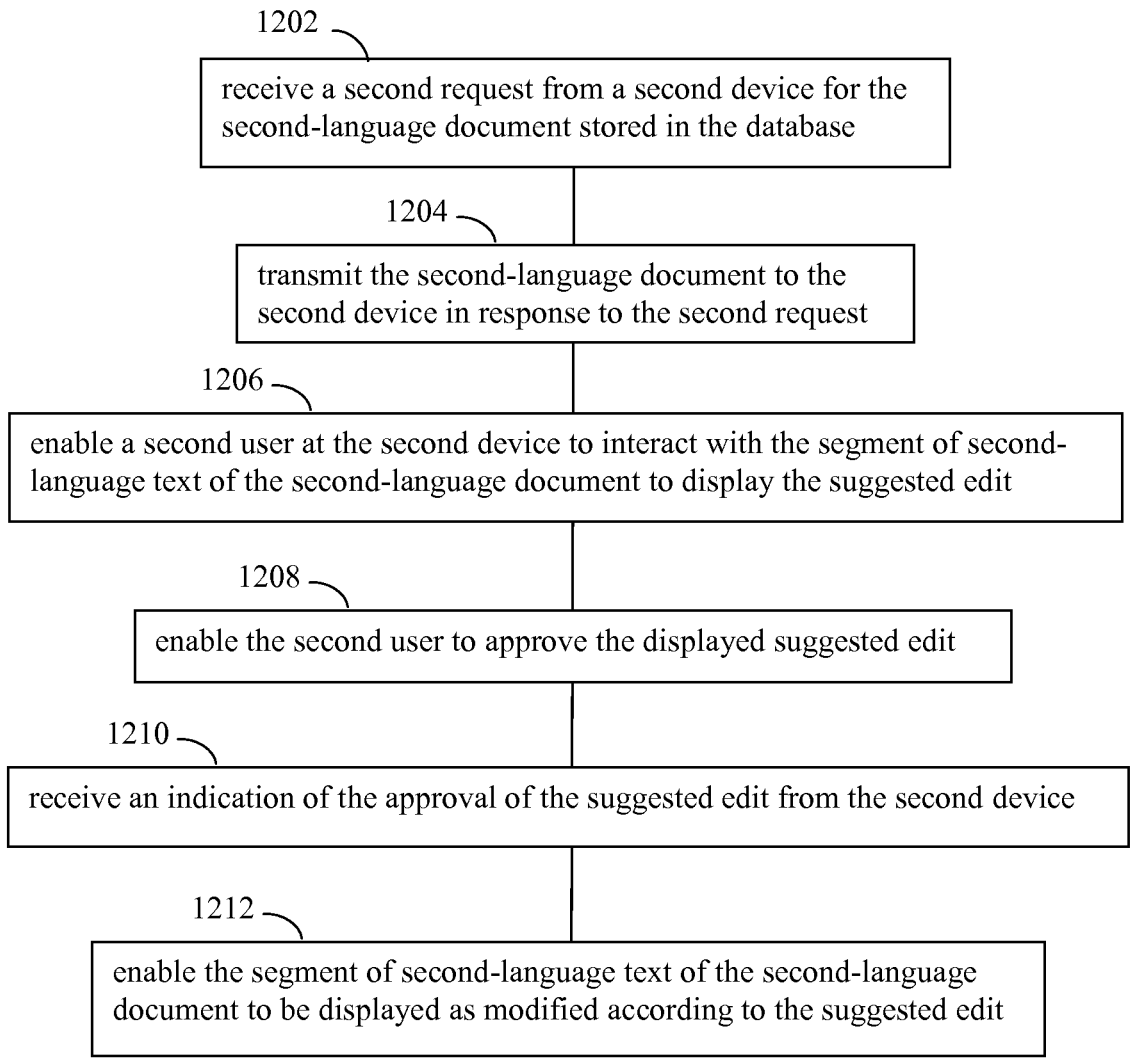

FIG. 12 shows a flowchart for approving suggested edits made to translated documents, according to an example embodiment.

FIGS. 17 and 18 show example processes for associating suggested edits with translated documents and for modifying the documents, according to embodiments.

FIG. 19 shows a flowchart assigning identifiers and processing suggested edits according to the assigned identifiers, according to an example embodiment.

Figure 20:
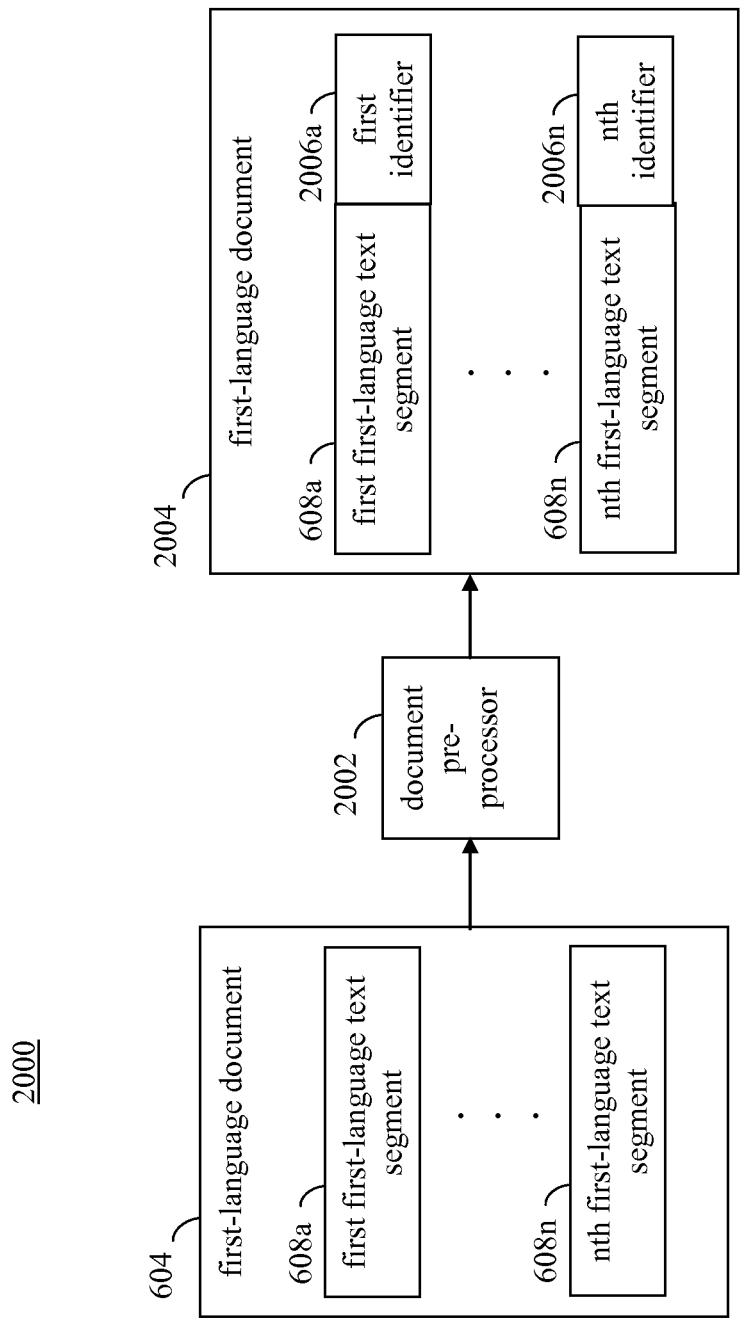

FIG. 20 shows a system for assigning identifiers, according to an embodiment.

Figure 21:
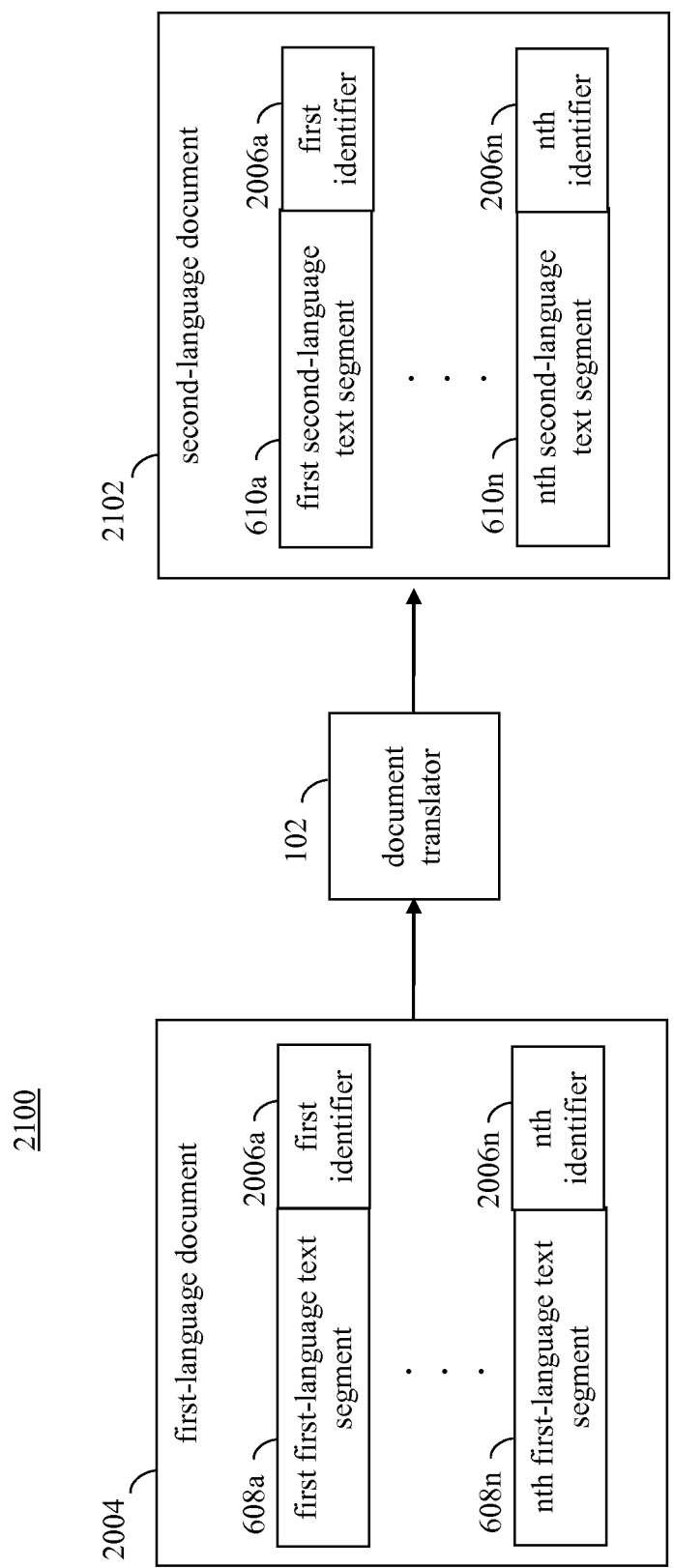

FIG. 21 shows a block diagram of a document translator translating a first-language document that includes identifiers, according to an example embodiment.

Figure 22:
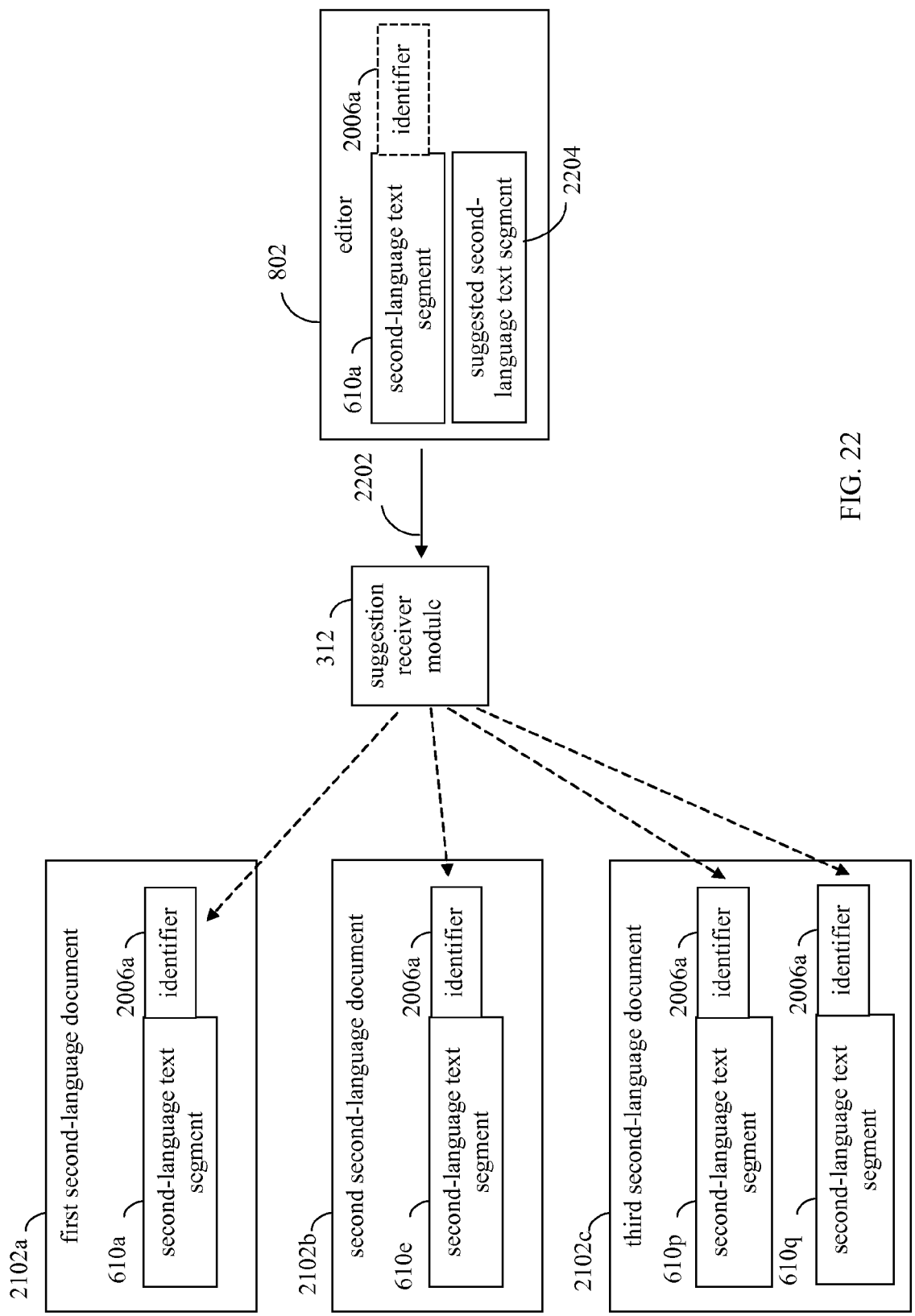

FIG. 22 shows a block diagram of an example of a suggestion receiver module associating a suggested edit with multiple instances of a second-language text segment, according to an embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification discloses one or more embodiments that incorporate the features of the invention. The disclosed embodiment(s) merely exemplify the invention. The scope of the invention is not limited to the disclosed embodiment(s). The invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

II. Machine Translations

A translation may be performed to interpret the meaning of text from a first language to a second language. A translation is not a simple word-for-word correspondence between any two languages. A translation should take into account constraints that include context, the rules of grammar of the first and second languages, and the writing conventions and idioms of the first and second languages.

Figure 1:
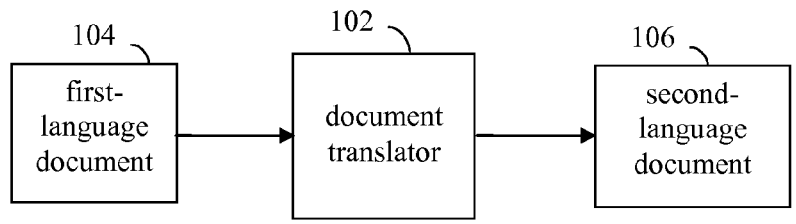
FIG. 1 shows a block diagram of an example machine translation system.

Machine translation (MT) is a machine-based technique for generating translations. FIG. 1 shows a block diagram of an example machine translation system 100. As shown in FIG. 1, system 100 includes a document translator 102. Document translator 102 may be a computer-based translation program, for example. Document translator 102 receives a first-language document 104. Document translator 102 translates first-language document 104 from a first language to a second language. Document translator 102 generates a second-language document 106, which is the second language version of first-language document 104. Document translator 102 may be configured to generate second-language document 106 from first-language document 104 without further human intervention. Typically, however, machine-based translations, such as performed by document translator 102, do involve human intervention. Such human intervention may be provided in the form of pre-editing and/or post-editing, to improve translation accuracy, based on the translation constraints mentioned above.

Document translator 102 may be used in a translation memory environment. A translation memory is a type of database that may be used with document translator 102 to aid human translators. A translation memory includes text segments in a source language and their translations into one or more target languages. These text segments can be blocks, paragraphs, sentences, phrases, or other segments of text. Translation memories are commonly used on translation projects to leverage work and improve consistency across the content being translated.

Some web sites that display machine translated content enable human users to submit corrections to machine translated text. However, the generated corrections are not viewable to other users of document translator 102. Instead, the generated corrections may be stored and used for future training of document translator 102. Thus, other users are not enabled to weigh in whether the generated corrections are an improvement over the original text. Examples of machine translation tools accessible via the Internet that do not enable users to view corrections submitted by other users include translate.google.com (for beta languages only), which is published by Google Inc. of Mountain View, Calif., and translate.live.com, which is published by Microsoft Corporation of Redmond, Wash.

Embodiments of the present invention overcome these deficiencies of conventional machine translation tools and memories, enabling users to provide corrections to translated texts that are viewable and may be interacted with by other users. Example embodiments of the present invention are described in the following section.

III. Example Translation Memory Embodiments

Example embodiments for translation memories and for enabling the editing of translated text are described the following sections. The example embodiments described herein are provided for illustrative purposes, and are not limiting. Furthermore, additional structural and operational embodiments, including modifications/alterations, will become apparent to persons skilled in the relevant art(s) from the teachings herein.

FIG. 2 shows a block diagram of a translation memory system 200, according to an example embodiment. As shown in FIG. 2, system 200 includes a content database 202, a document server 204, a network 206, and a plurality of electronic devices 208. System 200 is configured to serve documents stored in content database 202 that are translations of other documents. System 200 enables users to provide suggested edits to translations, and for the supplied edits to be selectively incorporated into the translated documents. These elements of system 200 are described as follows.

As shown in FIG. 2, content database 202 stores a plurality of first-language documents 104*a*-10 *n* and a plurality of second-language documents 106*a*-106*n*. Second-language documents 106*a*-106*n* are documents that include text translated into a second language from the first-language documents 104*a*-104*n*, that include text in a first language. For example, second-language documents 106*a*-106*n* may be documents that include Spanish language text translated from English language text included in first-language documents 104*a*-104*n*. Documents 104*a*-104*n* and 106*a*-106*n* may have any suitable form, including being XML documents, PDF documents, text documents, word processor documents (e.g., Microsoft® Word documents), etc. Any number of first-language documents 104 and corresponding second-language documents 106 may be stored in content database 202, depending on the particular application. Content database 202 may include one or more of any type of storage mechanism to store documents 104*a*-104*n* and 106*a*-106*n*, including a hard disk drive, an optical disc drive, a memory device such as a RAM device, a ROM device, etc., and/or any other suitable type of storage medium.

As shown in FIG. 2, document server 204 is communicatively coupled with content database 202 by a communication link 210, and is communicatively coupled with electronic devices 208 through network 206. Content database 202 and document server 204 may be located nearby or remotely from each other. Document server 204 may be included in one or more servers and/or other computing devices configured to serve documents. Document server 204 is configured to receive requests for translated documents from electronic devices 208, to access the requested translated documents in content database 202, and to transmit the requested translated documents to the requesting electronic devices 208. Furthermore, document server 204 is configured to enable users at electronic devices 208 to submit suggested edits to translated documents, to enable users at electronic devices 208 to review the suggested edits, to enable users to accept the suggested edits, and to enable the translated documents to be displayed such that they appear to be modified according to the suggested edits.

Electronic devices 208 may include hundreds, thousands, or even further numbers of electronic devices. Three electronic devices 208*a*-208*c* are shown in FIG. 2, for illustrative purposes. Examples of electronic devices 208 include desktop computers, mobile computing devices, and mobile phones. For example, electronic device 208*a* may be a desktop computer, such as a personal computer. Electronic device 208*b* may be a mobile computing device, such as a mobile computer (e.g., a Palm® device, a personal digital assistant (PDA), a laptop computer, a notebook computer, etc.) or mobile email device (e.g., a RIM Blackberry® device). Electronic device 208*c* may be a mobile phone, such as a cell phone and/or smart phone, for example.

Each of electronic devices 208*a*-208*c* is shown in FIG. 2 as communicating with document server 204 through a corresponding communication link. For example, as shown in FIG. 2, electronic device 208*a* is communicatively coupled with network 206 through a first communication link 214*a*, electronic device 208*b* is communicatively coupled with network 206 through a second communication link 214*b*, and electronic device 208*c* is communicatively coupled with network 206 through a third communication link 214*c*. Document server 204 is shown communicatively coupled with network 206 through a fourth communication link 212. Network 206 may be a LAN, WAN (wide area network), or combination of networks, such as the Internet. First-fourth communication links 214*a*-214*c* and 212, and communication link 210 (between content database 202 and document server 204) may include any type or combination of communication links, including wired and/or wireless links, such as IEEE 802.11 wireless LAN (WLAN) wireless links, Worldwide Interoperability for Microwave Access (Wi-MAX) links, cellular network links, wireless personal area network (PAN) links (e.g., Bluetooth™ links), Ethernet links, USB links, etc.

Figure 3:
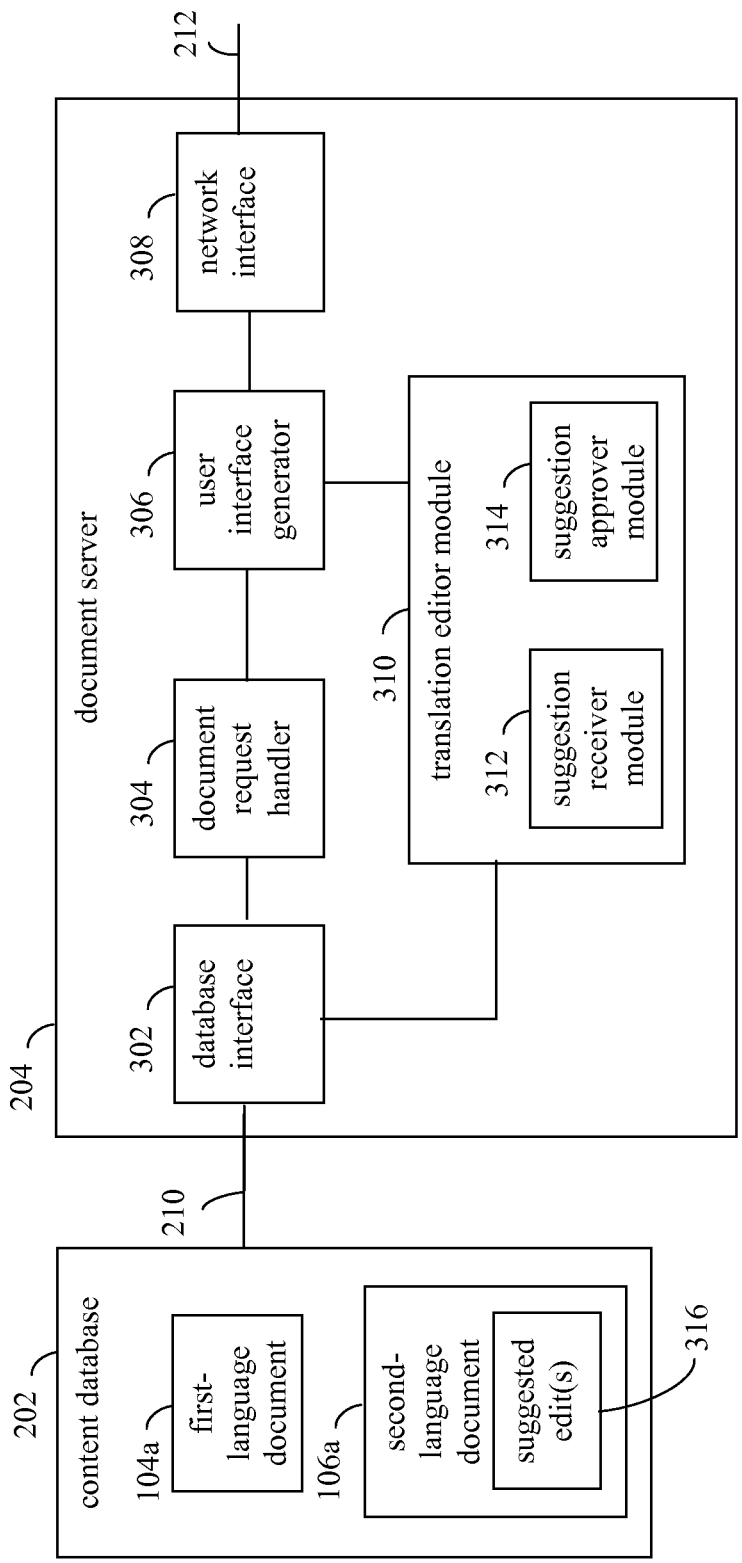
FIG. 3 shows a block diagram of a document server and a content database, according to an example embodiment.

Document server 204 shown in FIG. 2 may be implemented in various ways. For instance, FIG. 3 shows a block diagram of document server 204, according to an example embodiment. As shown in FIG. 3, document server 204 includes a database interface 302, a document request handler 304, a user interface generator 306, a network interface 308, and a translation editor module 310. These elements of document server 204 are described as follows.

Database interface 302 is configured as a communication interface for document server 204 for communications with content database 202. For example, database interface 302 enables access to documents stored in content database 202 for document server 204. Database interface 302 may include any communication interface mechanism suitable for enabling communications with content database 202, as would be known to persons skilled in the relevant art(s).

Network interface 308 is configured to enable document server 204 to communicate over network 206 through communication link 212. Network interface 308 may be any type of network interface (e.g., network interface card (NIC)), wired or wireless, such as an as IEEE 802.11 wireless LAN (WLAN) wireless interface, a Worldwide Interoperability for Microwave Access (Wi-MAX) interface, an Ethernet interface, a Universal Serial Bus (USB) interface, etc.

As shown in FIG. 3, user interface generator 306 is coupled to network interface 308. User interface generator 306 is configured to enable users at electronic devices 208 to interact with documents stored in content database 202, including requesting documents and editing documents, through a user interface medium. Document request handler 304 and translation editor module 310 are coupled to user interface generator 306 to receive document requests and edit requests from users at electronic devices 208, respectively. Furthermore, document request handler 304 and translation editor module 310 are coupled to database interface 302 to enable access to documents in content database 202.

Document request handler 304 is configured to process requests for documents in content database 202 that are input by users at electronic devices 208 to a user interface medium (e.g., a webpage) generated by user interface generator 306. Translation editor module 310 is configured to enable edits to translated documents stored in content database 202 that are input by users at electronic devices 208 to a user interface medium generated by user interface generator 306. As shown in FIG. 3, translation editor module 310 may include a suggestion receiver module 312 and a suggestion approver module 314. Suggestion receiver module 312 is configured to associate suggested edits to translated text that are input by users at electronic devices 208 with one or more corresponding documents stored in content database 202. Suggestion approver module 314 is configured to enable documents stored in content database 202 to appear to be modified according to the suggested edits if the suggested edits are accepted.

Note that document request handler 304, user interface generator 306, and translation editor module 310 (including suggestion receiver module 312 and suggestion approver module 314) may be implemented in hardware, software, firmware, or any combination thereof. For example, any one or more of document request handler 304, user interface generator 306, translation editor module 310, suggestion receiver module 312, and/or suggestion approver module 314 may be implemented as computer code configured to be executed in one or more processors. Alternatively, any one or more of document request handler 304, user interface generator 306, translation editor module 310, suggestion receiver module 312, and/or suggestion approver module 314 may be implemented as hardware logic/electrical circuitry.

Figure 4:
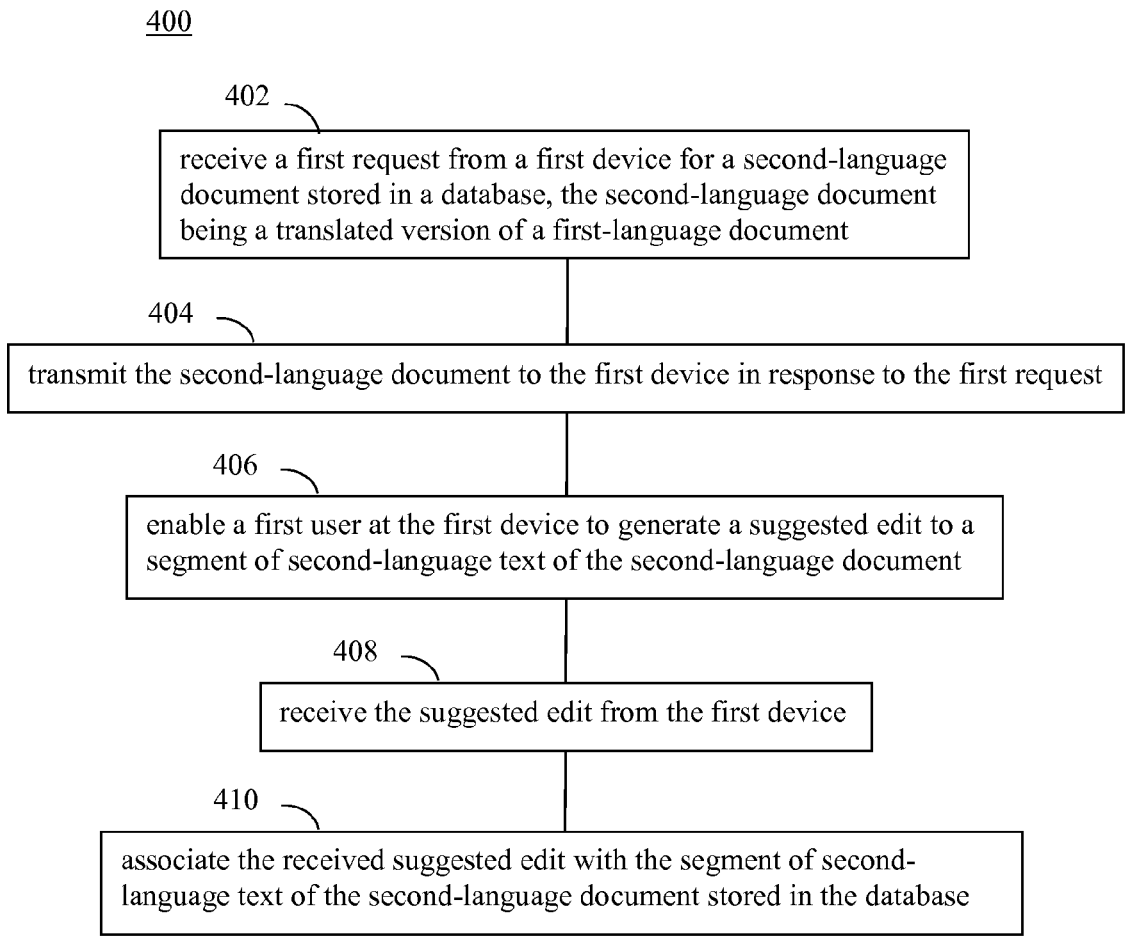
FIG. 4 shows a flowchart for serving translated documents and suggesting edits to translated documents, according to an example embodiment.

Embodiments for document server 204 are described in further detail with regard to FIGS. 4-16 in the following subsections. FIGS. 4 and 12 show example flowcharts for serving documents and processing suggested edits, according to embodiments. FIGS. 5, 11, and 16 show examples of communications occurring in translation memory system 200, according to embodiments. FIGS. 6-10 and 13-15 show block diagrams of example user interfaces that may be provided by document server 204 at electronic devices 208, according to embodiments.

A. Example Embodiments for Serving Documents and Enabling Suggested Edits

As described above, document server 204 may be configured to serve translated documents and to enable suggested edits to translated documents to be provided by users. FIG. 4 shows a flowchart 400 for serving documents and receiving suggested edits, according to an example embodiment. Flowchart 400 may be performed by document server 204, for example. Other structural and operational embodiments will be apparent to persons skilled in the relevant art(s) based on the discussion regarding flowchart 400. Flowchart 400 is described as follows.

In step 402, a first request is received from a first device for a second-language document stored in a database, the second-language document being a translated version of a first-language document. For instance, FIG. 5 shows translation memory system 200, where an example request 502 is transmitted from electronic device 208*a*. Request 502 includes a request for a second-language document in content database 202, such as second-language document 106*a*. As shown in FIG. 5, request 502 is transmitted from electronic device 208*a* on communication link 214*a*, through network 206, and is received by document server 204 on communication link 212. In response to request 502, document server 204 accesses content database 202 with a document request 504. In response, content database 202 provides second-language document 106*a* to document server 204 in a requested document response 506.

Referring to FIGS. 3 and 5, request 502 may be generated at electronic device 208*a* by a user interacting with a user interface medium generated by user interface generator 306. For example, the user at electronic device 208*a* may interact with document server 204 using a website. In such an embodiment, user interface generator 306 may transmit a webpage to electronic device 208*a* that enables the user to select second-language document 106*a*, and the selection is transmitted to document server 204 in request 502. User interface generator 306 may receive request 502 through network interface 308, and may provide request 502 to document request handler 304. Document request handler 304 may be configured to request second-language document 106*a* from content database 202 through database interface 302. Document request handler 304 may receive second-language document 106*a* through database interface 302 as requested in document response 506.

In step 404, the second-language document is transmitted to the first device in response to the first request. Referring to FIG. 5, document server 204 may transmit the requested second-language document, which in the current example is second-language document 106*a*, in a response 508. Response 508 is transmitted from document server 204 on communication link 212 through network 206, and is received at electronic device 208*a* on communication link 214*b*.

Referring to FIG. 3, user interface generator 306 may be configured to generate a webpage or other user interface medium in which to display second-language document 106*a* to the user at electronic device 208*a*. User interface generator 306 may transmit (through network interface 308) the generated webpage or other user interface medium to second electronic device 208*a* in response 508.

Figure 6:
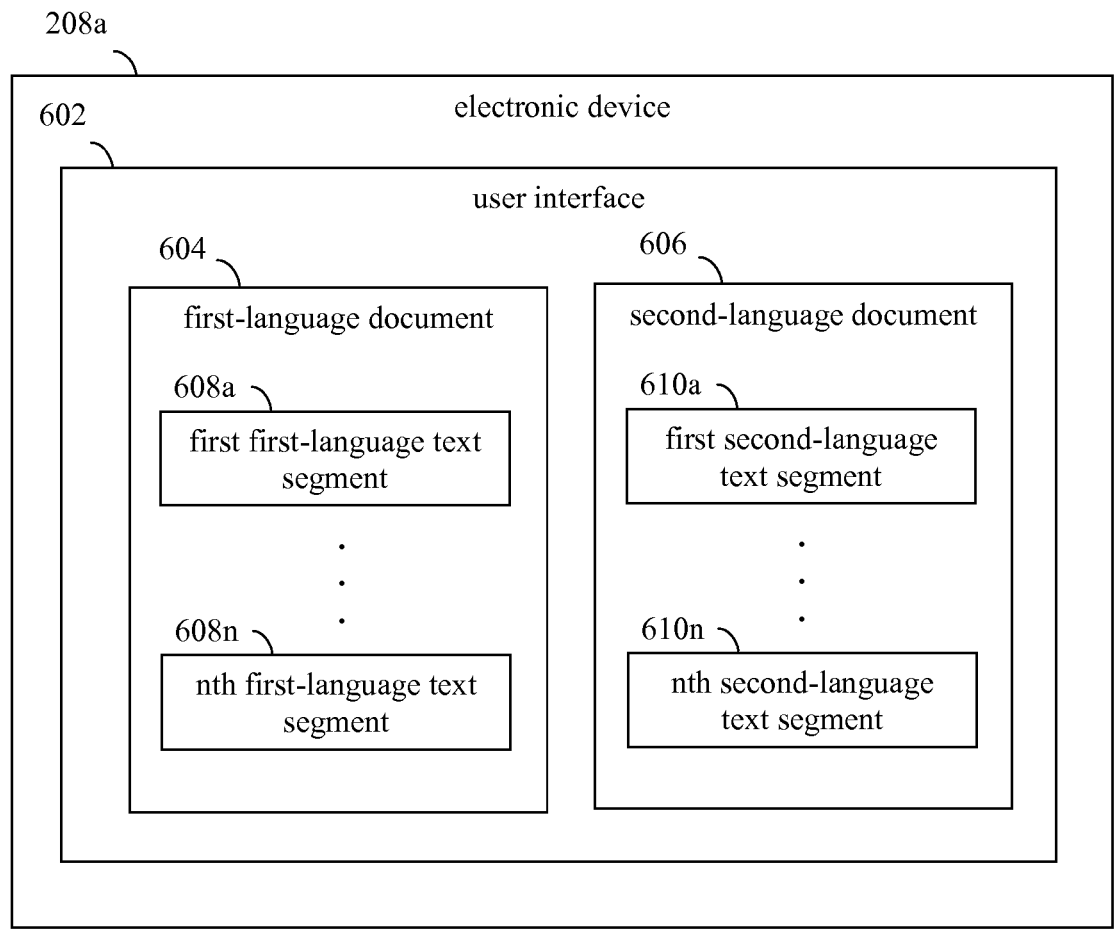

For example, FIG. 6 shows a block diagram of a user interface 602 that may be provided at electronic device 208a, according to an example embodiment. For example, user interface 602 may include a display device. User interface 602 displays a second-language document 606, which is an example of second-language document 106a. As shown in FIG. 6, second-language document 606 includes a plurality of second-language text segments 610. In the example of FIG. 6, first-nth second-language text segments 610a-610n are included in second-language document 606, although in embodiments, any number of second-language text segments 610 may be present. Each of second-language text segments 610a-610n may be a segment of text of second-language document 606 that includes multiple words, including a sentence, a paragraph, a block, a phrase, etc.

As shown in FIG. 6, user interface 602 also displays a first-language document 604. Second-language document 606 is a translation of first-language document 604 (from a first language present in first-language document 604 to a second language). First-language document 604 is an example of first-language document 104a stored in content database 202, as shown in FIG. 5. First-language document 604 may also stored in content database 202 along with second-language document 606, and may also be transmitted to electronic device 208a in response 508. As shown in FIG. 6, first-language document 604 includes a plurality of first-language text segments 608a-608n, corresponding to first-nth second-language text segments 610a-610n included in second-language document 606. For example, first second-language text segment 610a may be a translation of first first-language text segment 608a, second second-language text segment 610b may be a translation of second first-language text segment 608b, etc.

Figure 7:
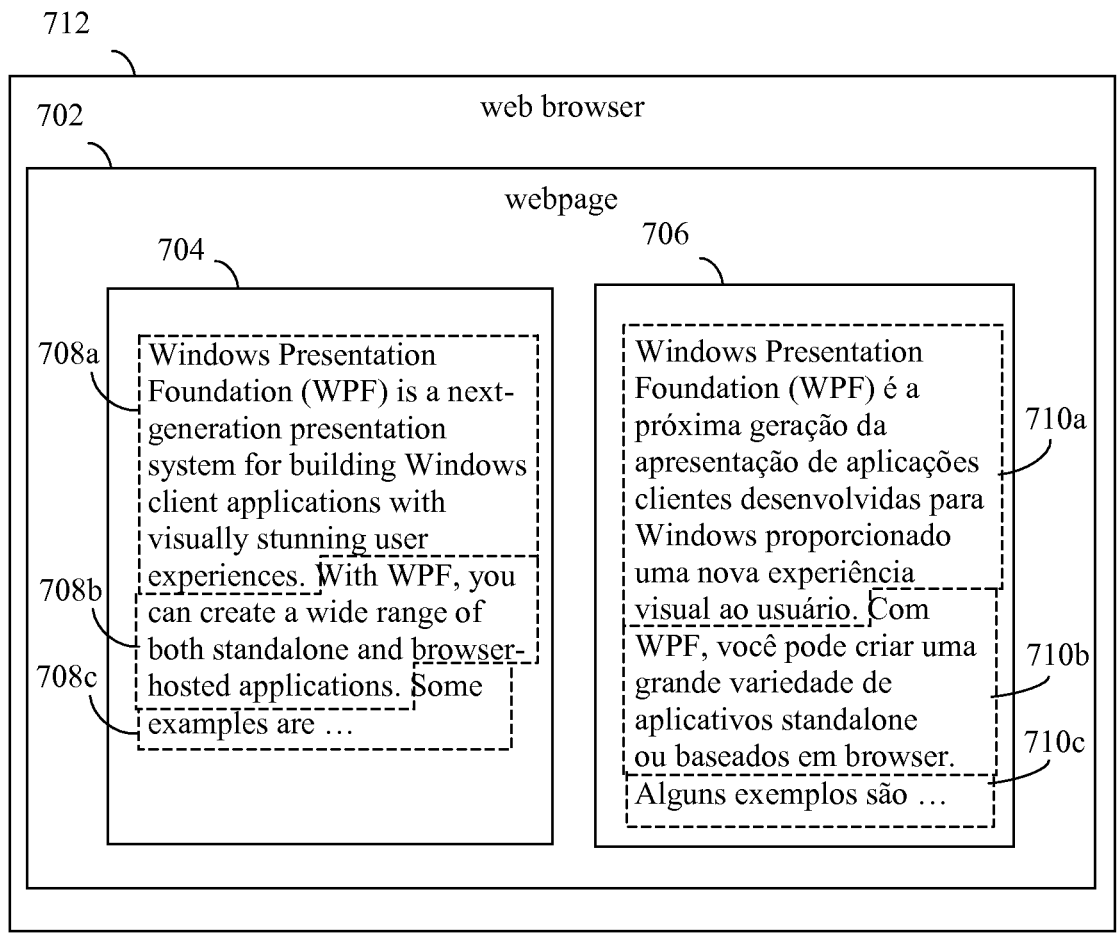

FIG. 7 shows a web browser 712 that is an example of user interface 602 shown in FIG. 6, according to an embodiment. As shown in FIG. 7, web browser 712 displays a webpage 702. Webpage 702 includes a first-language document 704 and a second-language document 706, which are examples of first-language document 604 and second-language document 606 shown in FIG. 6, respectively. In the example of FIG. 7, first-language document 704 is an English-language document, and second-language document 706 is a Brazilian Portuguese language document. First-third first-language text segments 708a-708c are shown for first-language document 704, and corresponding first-third second-language text segments 710a-710c are shown for second-language document 706. In the example of FIG. 7, text segments 708a-708c and 710a-710c are sentences.

Referring back to FIG. 4, in step 406, a first user at the first device is enabled to generate a suggested edit to a segment of second-language text of the second-language document. For example, in an embodiment, user interface generator 306 may be configured to enable a user at first electronic device 208a to input a suggested edit to a displayed segment of text.

As shown in FIG. 6, first-language document 604 and second-language document 606 may be displayed adjacent to each other (e.g., horizontally (side-by-side), vertically, etc.) so that the user of electronic device 208a may be enabled to verify an accuracy of the translation of first-language document 604 to second-language document 606. For instance, the user may verify whether first second-language text segment 610a is an accurate translation of first first-language text segment 608a, whether second second-language text segment 610b is an accurate translation of second first-language text segment 608b, etc.

Figure 8:
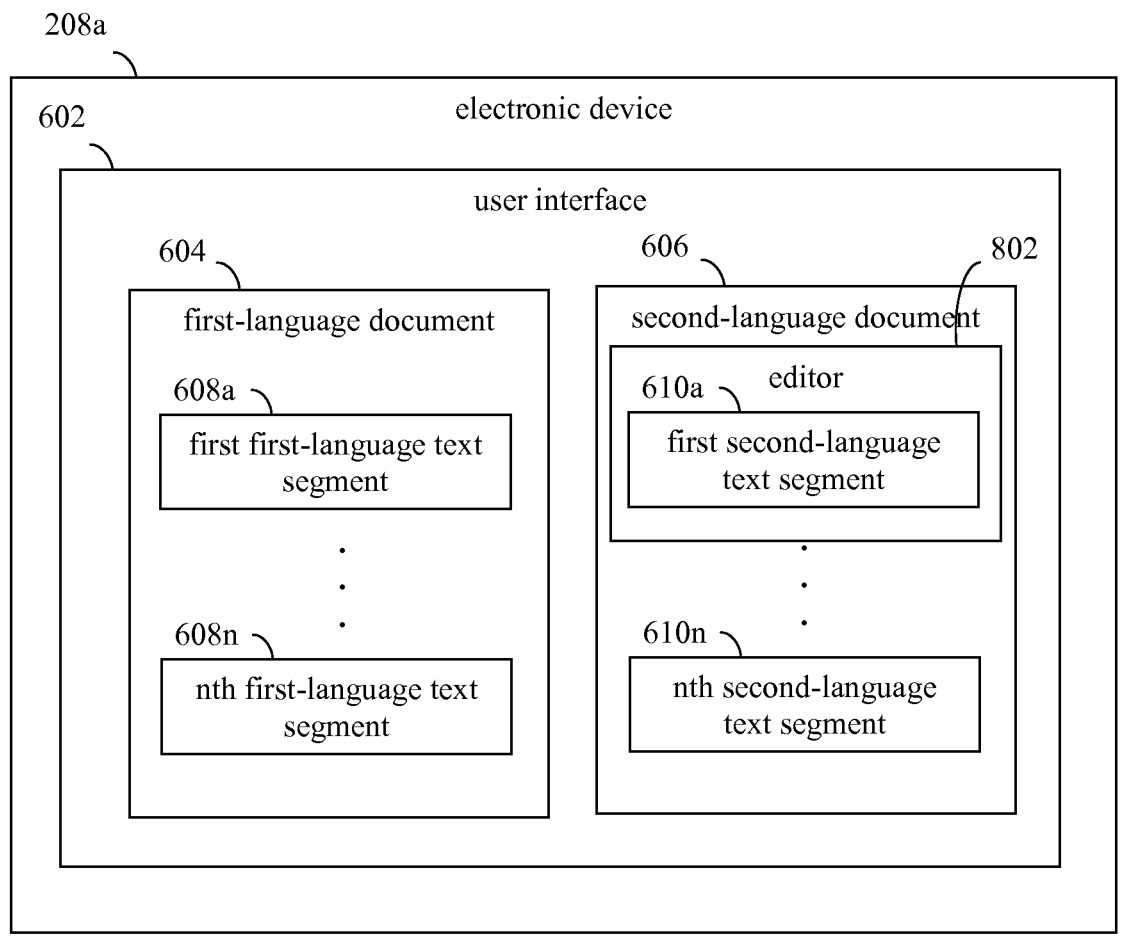

For example, by comparing first first-language text segment 608a and first second-language text segment 610a, the user may determine that the translation provided by first second-language text segment 610a needs improvement. FIG. 8 shows a block diagram of user interface 602 of FIG. 6 displaying an editor 802 configured to enable the user at electronic device 208a to generate a suggested edit to first second-language text segment 610a. Editor 802 may be invoked in any manner, including by selecting or otherwise interacting with first second-language text segment 610a (e.g., using a mouse pointer, by keyboard interaction, by voice command, etc.). Editor 802 may have any configuration suitable to enable the user to provide suggested edits to first second-language text segment 610a, as would be known to persons skilled in the relevant art(s). For example, in an embodiment, editor 802 may be a standard text editor.

Figure 9:
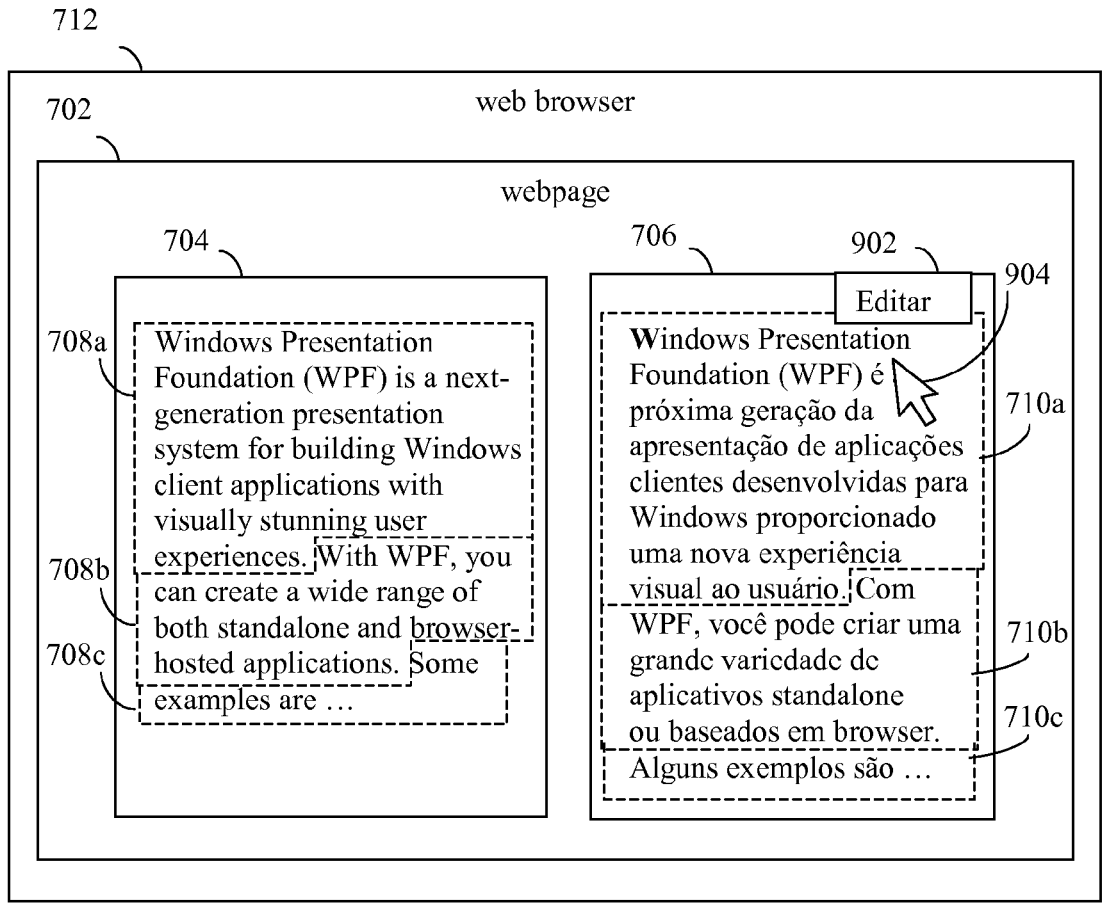

FIG. 9 shows webpage 702 of FIG. 7 configured to enable selected second-language text segments to be edited, according to an example embodiment. As shown in FIG. 9, the user may position a cursor 904 over a second-language text segment 710 desired to be edited, such as first second-language text segment 710a. By positioning cursor 904 over first second-language text segment 710a, an editor button 902 is generated adjacent to text segment 710a. As shown in FIG. 9, editor button 902 may display text in the second language indicating that an editor may be opened by selecting editor button 902, such as display of the text "Editar" in Brazilian Portuguese. By selecting editor button 902 using cursor 904, a text editor may be invoked.

Figure 10:
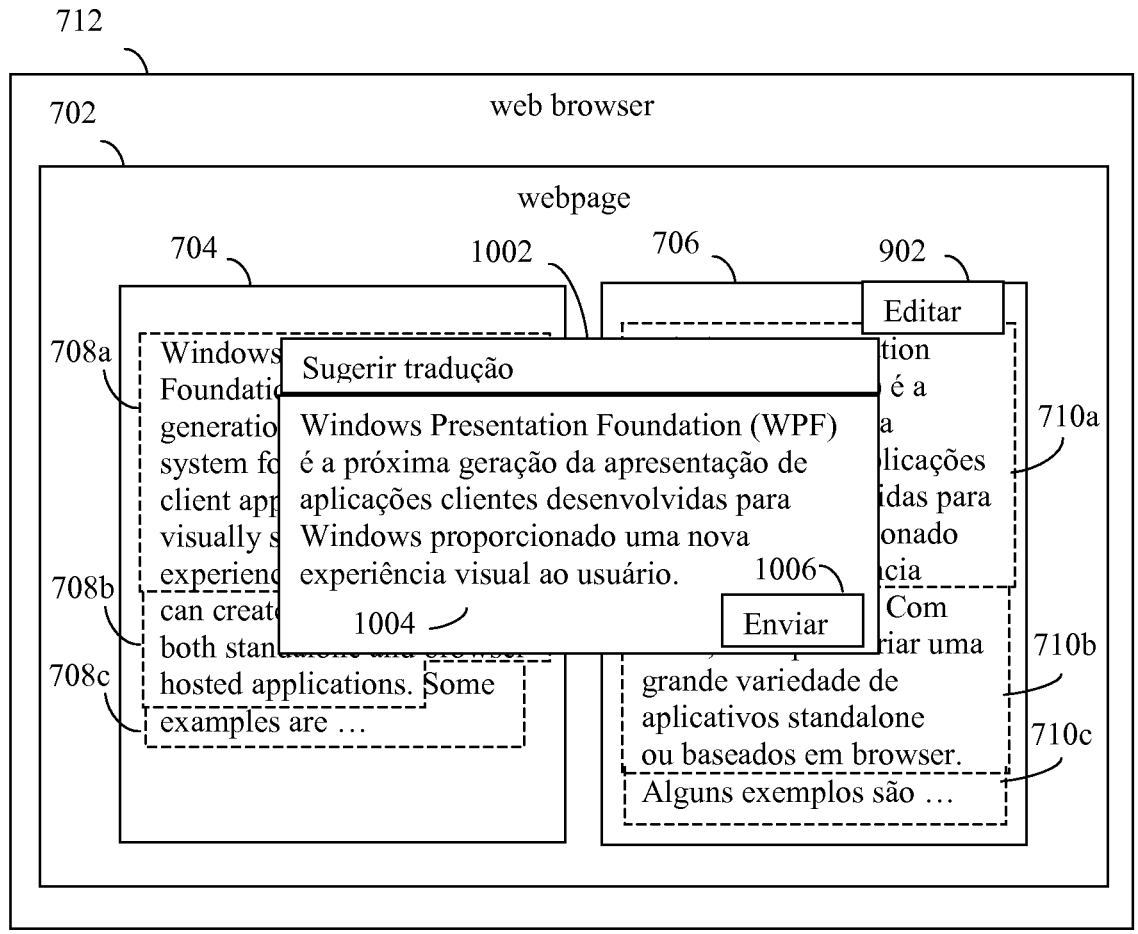

FIG. 10 shows webpage 702 of FIG. 9, with a text segment editor window 1002 that is open. Text segment editor window 1002 may be invoked by selecting editor button 902. Text segment editor window 1002 includes a text entry region 1004 and an enter button 1006 (labeled "Enviar" in the example second language of Brazilian Portuguese). The user can type or otherwise enter a suggested edit to first second-language text segment 710a in text entry region 1004. When the user is finished entering the suggested edit, the user may interact with enter button 1006 to submit the suggested edit. The suggested edit may include one or more edits to text segment 710a, or may include a complete edited sentence that may be used to completely replace text segment 710a. Note that text segment editor window 1002 may be displayed anywhere in webpage 702, including in the center as shown in FIG. 10, or elsewhere in or outside of webpage 702, including in a manner that does not obstruct the view of first-language text segment 708a to the user (for reference by the user).

Referring back to FIG. 4, in step 408, the suggested edit is received from the first device. For instance, FIG. 11 shows translation memory system 200, where an example suggested edit 1102 is transmitted from electronic device 208a. Suggested edit 1102 includes the suggested edit input by the user to a text segment of the second-language document received in response 508 (shown in FIG. 5). As shown in FIG. 11, suggested edit 1102 is transmitted from electronic device 208a on communication link 214a, through network 206, and is received by document server 204 on communication link 212.

In step 410, the received suggested edit is associated with the segment of second-language text of the second-language document stored in the database. In response to suggested edit 1102, document server 204 accesses content database 202 with an association request 1104. As shown in FIG. 11, association request 1104 associates suggested edit 1102 with second-language document 106a in content database 202 (shown as suggested edit 1114 in FIG. 11).

Referring to FIG. 3, suggested edits may be processed by suggestion receiver module 312. For example, suggestion receiver module 312 may receive one or more suggested edits from electronic device 208a through network interface 308. Suggestion receiver module 312 may be configured to associate one or more suggested edits with corresponding second-language documents in content database 202, such as second-language document 106a, as one or more suggested edit(s) 316. Any number of suggested edits, including suggested edit 1114 shown in FIG. 11, may be associated with one or more text segments of second-language document 106. For example, multiple users at electronic devices 208 may each submit a suggested edit to the same second-language text segment, such as second-language text segment 710a shown in FIG. 7.

Suggestion receiver module 312 may be configured to associate each of the suggested edits with the text segment of second-language document 106. Furthermore, users may submit suggested edits to more than one second-language text segment of second-language document 106. Suggestion receiver module 312 may be configured to associate each of the suggested edits with respective text segments of second-language document 106. Still further, in an embodiment, suggestion receiver module 312 may be configured to associate a suggested edit with multiple instances of the same text segment that are present in one or more second-language documents in content database 202. Example embodiments for associating a suggested edit with multiple instances of a text segment are described in detail further below.

In embodiments, suggestion receiver module 312 may be configured to associate a suggested edit with a second-language document 106 by storing the suggested edit in second-language document 106 in content database 202, by linking the suggested edit to second-language document 106 (e.g., using a list or other mechanism maintained in content database 202 or in document server 204), or by other technique.

B. Example Embodiments for Processing Approved Suggested Edits

As described above, document server 204 may be configured to enable suggested edits to be approved. FIG. 12 shows a flowchart 1200 for approving suggested edits to translated documents, according to an example embodiment. Flowchart 1200 may be an extension of flowchart 400 shown in FIG. 4, and/or may be performed by document server 204, in embodiments. Other structural and operational embodiments will be apparent to persons skilled in the relevant art(s) based on the discussion regarding flowchart 1200. Flowchart 1200 is described as follows.

In step 1202, a second request is received from a second device for the second-language document stored in the database. For instance, FIG. 11 shows a second request 1106 transmitted from electronic device 208b. Request 1106 includes a request for a second-language document in content database 202, such as second-language document 106a. As shown in FIG. 11, request 1106 is transmitted from electronic device 208b on communication link 214b, through network 206, and is received by document server 204 on communication link 212. In response to request 1106, document server 204 accesses content database 202 with a document request 1108. Content database 202 provides second-language document 106a to document server 204 in a requested document response 1110. Referring to FIG. 3, request 1106 may be enabled and processed by user interface generator 306 and document request handler 304 in a similar manner as described above with respect to request 502 shown in FIG. 5.

In step 1204, the second-language document is transmitted to the second device in response to the second request. Referring to FIG. 11, document server 204 may transmit the requested second-language document, which in the current example is second-language document 106a, in a response 1112. Response 1112 is transmitted from document server 204 on communication link 212 through network 206, and is received at electronic device 208b on communication link 214b. Response 1112 may further include any suggested edits associated with translated text segments of second-language document 106a, or suggested edits may be transmitted in separate communications from response 1112 (e.g., being transmitted on demand).

Referring to FIG. 3, user interface generator 306 may be configured to generate a webpage or other user interface medium in which to display second-language document 106a to the user at electronic device 208b (e.g., similar to webpage 702 shown in FIG. 9). User interface generator 306 may transmit (through network interface 308) the generated webpage or other user interface medium to second electronic device 208b in response 508.

Figure 13:
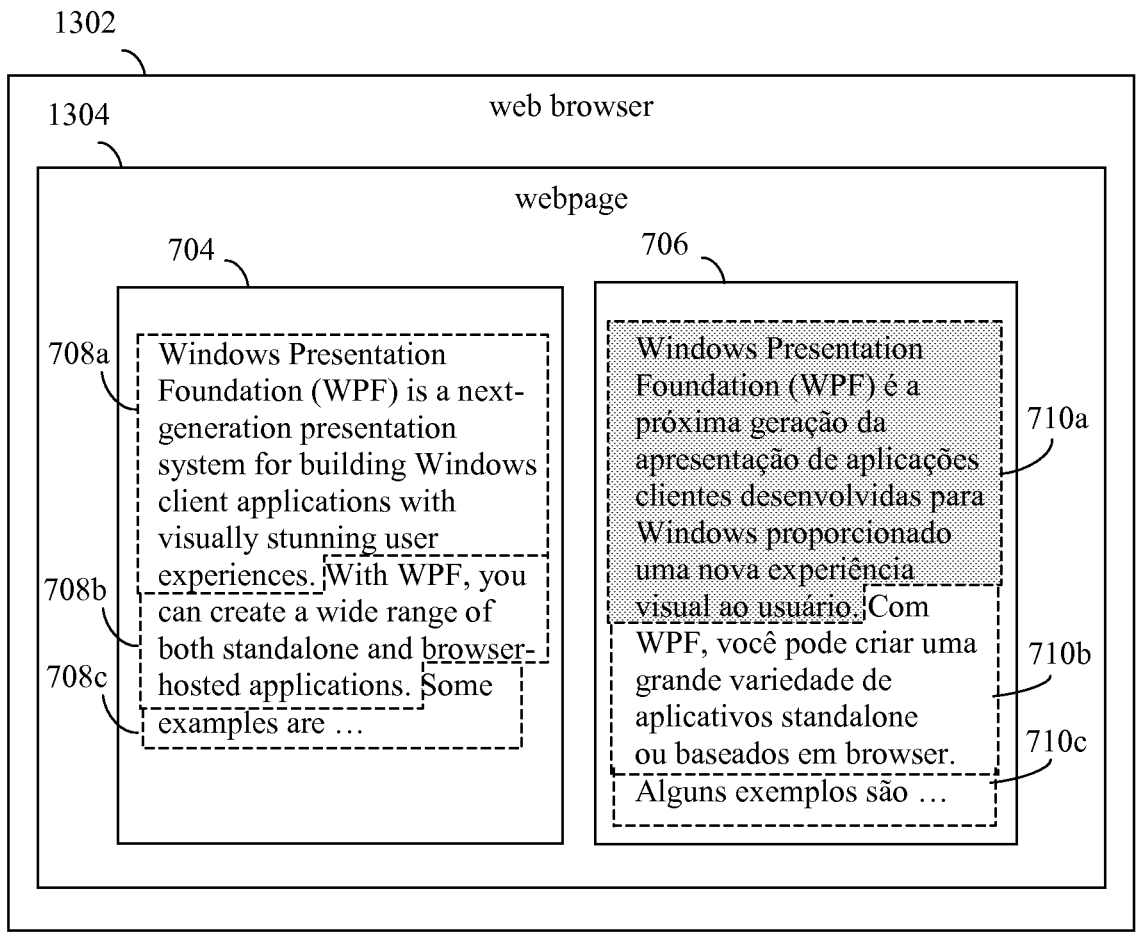

FIG. 13 shows a web browser 1302 that is an example of a user interface that may be provided at electronic device 208b, according to an embodiment. As shown in FIG. 13, web browser 1302 displays a webpage 1304 (e.g., generated by user interface generator 306) that displays first-language document 704 and second-language document 706. First-third first-language text segments 708a-708c are shown for first-language document 704, and corresponding first-third second-language text segments 710a-710c are shown for second-language document 706. As shown in FIG. 13, first second-language text segment 710a is highlighted to indicate that a suggested edit (suggested edit 1114 shown in FIG. 11) is associated with first second-language text segment 710a. Note that an indication of the suggested edit associated with first second-language text segment 710a may be provided in any manner, including by highlighting text segment 710a (as in FIG. 13), by bolding, italicizing, and/or underlining text segment 710a, by displaying an indicator (e.g., a box, button, icon, etc.) on or adjacent to text segment 710a, etc.

In step 1206, a second user at the second device is enabled to interact with the segment of second-language text of the second-language document to display the suggested edit. For example, in an embodiment, user interface generator 306 may be configured to enable a user at first electronic device 208a to interact with a second-language text segment 710 having an associated suggested edit, such as first second-language text segment 710a in the current example.

Figure 14:
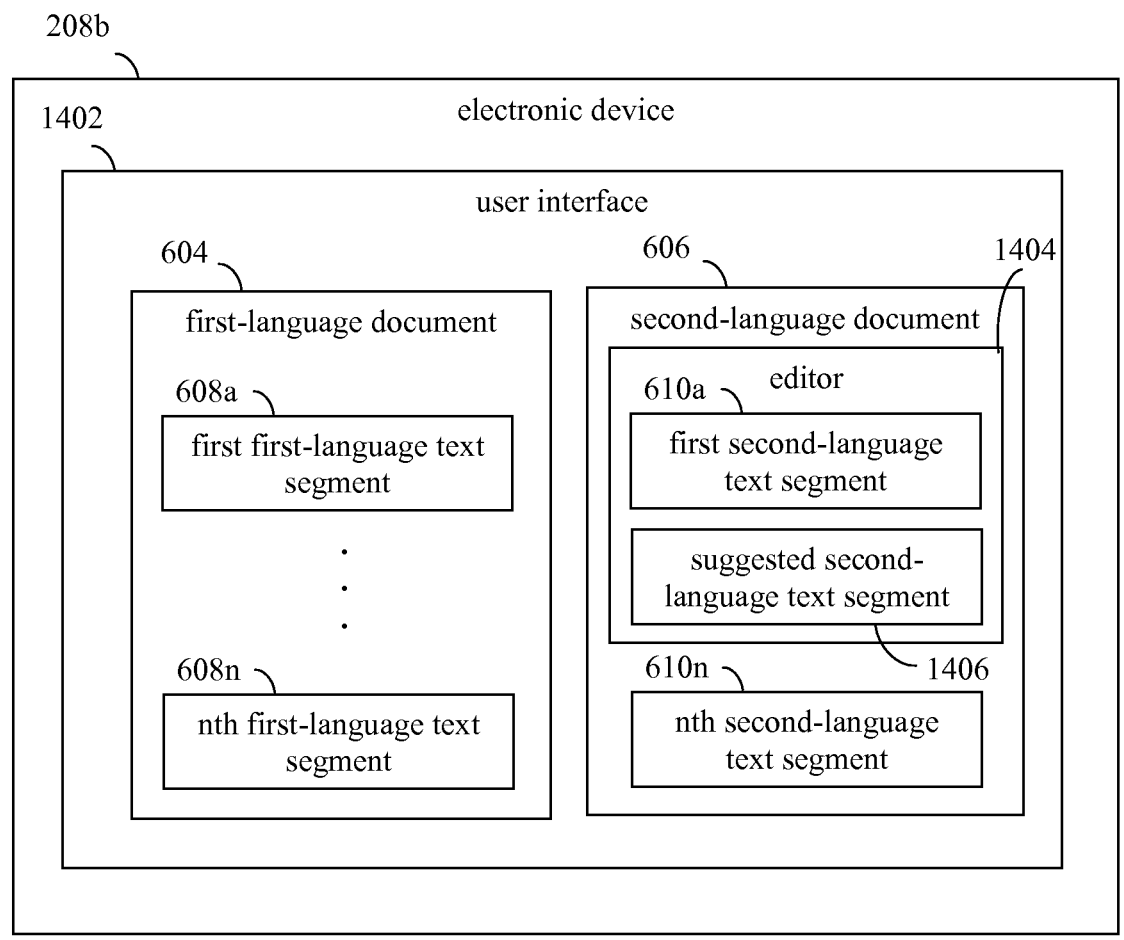

For example, referring to FIG. 13, a user at electronic device 208b may be enabled to interact with first second-language text segment 710a to display suggested edit 1114. FIG. 14 shows a block diagram of a user interface 1402 of electronic device 208b displaying an editor 1404 configured to enable the user at electronic device 208b to view any suggested edits associated with first second-language text segment 610a in content database 202, including a suggested second-language text segment 1406. Editor 1404 may be invoked in any manner, including by selecting or otherwise interacting with first second-language text segment 610a (e.g., using a mouse pointer, by keyboard interaction, by voice command, etc.). Editor 1404 may have any configuration suitable to enable the user to view and/or provide further suggested edits to first second-language text segment 610a, as would be known to persons skilled in the relevant art(s).

Figure 15:
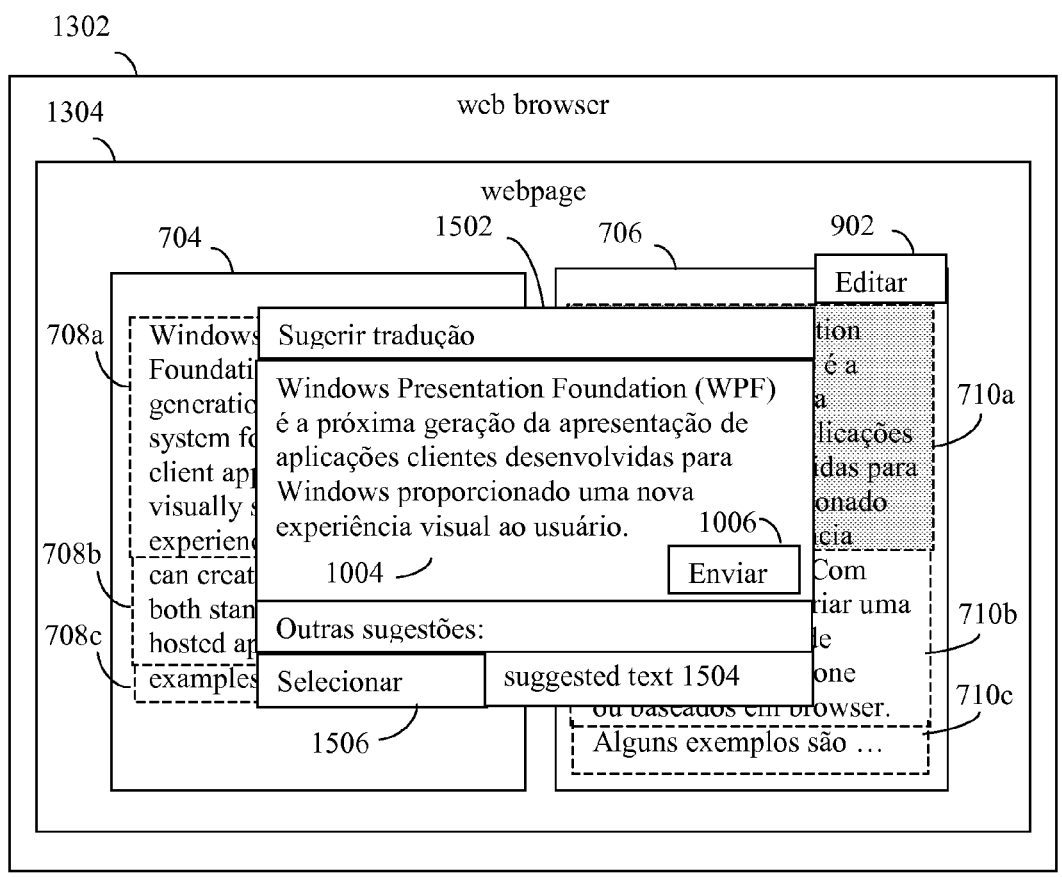

For instance, FIG. 15 shows webpage 1304 of FIG. 13 displaying a text segment editor window 1502 that is an example of editor 1404, according to an embodiment. In the example of FIG. 15, a user of second electronic device 208a may select editor button 902 to invoke editor window 1502. Similarly to editor window 1002 shown in FIG. 10, editor window 1502 includes text entry region 1004 and enter button 1006. Because one or more suggested edits are associated with first second-language text segment 710a, editor window 1502 further includes a suggested edit selection portion that includes a selection button 1506 (labeled "Selecionar" in the example second language of Brazilian Portuguese) and corresponding suggested text 1504. The user can type or otherwise enter a suggested edit to first second-language text segment 710a in text entry region 1004 if the user desires to submit another suggested edit to text segment 710a (as described above). Furthermore, the user can view suggested text 1504, which is a suggested edit to text segment 710a submitted by a previous user (and stored in content database 202). For example, suggested text 1504 may include suggested edit 1114 submitted by the user at electronic device 208a, as described above. Any number of suggested text 1504 entries (and corresponding selection buttons 1506) may be present in editor window 1502, depending on the number of suggested edits provided by users to text segment 710a.

In step 1208, the second user is enabled to approve the displayed suggested edit. For instance, referring to FIG. 3, user interface generator 306 may be configured to enable a user at second electronic device 208b to approve a displayed suggested edit for a second-language text segment. The user may approve the displayed suggested edit if the user believes that the suggested edit improves the translation of the particular second-language text segment. Any type of user interface mechanism may be used to enable the user to approve a displayed suggested edit. For example, referring to FIG. 15, the user may approve suggested text 1504 by interacting with selection button 1506 (e.g., by clicking with a mouse pointer, etc.).

Note that in an embodiment, a user may need to be authorized to approve displayed suggested edits. For example, the second user referenced in step 1208 may need to be authorized in order to be enabled to approve displayed suggested edits. In one example, the second user may need to be a "moderator" or have other suitable role that includes approval privileges. The second user may need to provide a login ID and/or a password to be granted such approval privileges.

In step 1210, an indication of the approval of the suggested edit is received from the second device. For instance, FIG. 16 shows translation memory system 200, where an example suggested edit approval indication 1602 is transmitted from electronic device 208b. Approval indication 1602 indicates that a particular suggested edit to a particular text segment of the second-language document is approved. As shown in FIG. 16, approval indication 1602 is transmitted from electronic device 208b on communication link 214b, through network 206, and is received by document server 204 on communication link 212.

In step 1212, the segment of second-language text of the second-language document is enabled to be displayed as modified according to the suggested edit. For example, in an embodiment, suggested edit 1114 is maintained in content database 202 or in document server 204, and is applied to modify second-language document 106a the next time that second-language document 106a is requested by a user at an electronic device 208. For example, suggested edit 1114 may be enabled to be applied to the text segment of second-language document 106a at render time, the next time (and any subsequent time) that the text segment is displayed at an electronic device 208.

In another embodiment, in response to approval indication 1602, document server 204 accesses content database 202 with a document edit request 1604. As shown in FIG. 16, document edit request 1604 is received by content database 202. For example, approval indication 1602 may indicate that suggested edit 1114 (shown in FIG. 11) is approved. In an embodiment, document edit request 1604 initiates an editing of second-language document 106a in content database 202 to revise text segment 710a (shown in FIG. 15) according to suggested edit 1114 to generate modified second-language document 1606 shown in FIG. 16. In another embodiment, document edit request 1604 requests second-language document 106a from content database 202. Document server 204 receives second-language document 106a and suggested edit 1114 from content database 202, modifies second-language document 106a according to suggested edit 1114, and stores the modified version of second-language document 106a in content database 202 as modified second-language document 1606 shown in FIG. 16.

Referring to FIG. 3, the handling of approved suggested edits may be processed by suggestion approver module 314 in document server 204. For example, suggestion approver module 314 may receive approval indication 1602 from electronic device 208b through network interface 308. Suggestion approver module 314 may be configured to maintain suggested edit 316 in content database 202 (e.g., in cases where suggested edit 316 is to be displayed at render time for the corresponding second-language text), or to modify second-language document 106 according to the corresponding suggested edit 316. Suggestion approver module 314 may be configured to generate document edit request 1604 (shown in FIG. 16) to instruct content database 202 to modify the affected text segment according to the suggested edit to generate modified second-language document 1606 shown in FIG. 16. Alternatively, suggestion approver module 314 may include document modification capability. Suggestion approver module 314 may be configured to generate document edit request 1604 to request second-language document 106 from content database 202. Suggestion approver module 314 may receive second-language document 106 and the suggested edit from content database 202, may modify second-language document 106 according to the suggested edit, and may store the modified version of second-language document 106 in content database 202 as modified second-language document 1606 shown in FIG. 16.

As described above, a suggested edit provided by a user to a second-language text segment may be associated by document server 204 with multiple instances of the second-language text segment that are present in one or more second-language documents in content database 202. In an embodiment, if the suggested edit is subsequently approved with regard to one of the second-language documents, suggestion approver module 314 may be configured to enable the suggested edit to be displayed (e.g., at render time) for each of the second-language documents when the text segment is subsequently displayed at an electronic device 208, or may be configured to modify all of the second-language documents that include the text segment according to the suggested edit. Examples embodiments for modifying multiple instances of a second-language text segment according to an approved suggested edit are described in the following subsection.

C. Example Embodiments for Handling Suggested Edits with Regard to Text Segments having Multiple Instances As described above, in an embodiment, a suggested edit provided by a user to a second-language text segment may be associated by document server 204 with multiple instances of the second-language text segment that are present in one or more second-language documents in content database 202. Furthermore, in an embodiment, if the suggested edit is subsequently approved with regard to one of the second-language documents that include an instance of the second-language text segment, document server 204 may enable the suggested edit to be displayed (e.g., at render time) for each of the second-language documents when the text segment is subsequently displayed at an electronic device 208, or may modify all of the second-language documents in content database 202 that include the text segment according to the suggested edit.

For example, in an embodiment, step 410 of flowchart 400 in FIG. 4 may include step 1702 shown in FIG. 17. In step 1702, the received suggested edit is associated with a plurality of instances of the second-language text segment contained in one or more second-language documents stored in the database. For example, in an embodiment, suggestion receiver module 312 in FIG. 3 may be configured to perform step 1702. Referring to FIG. 11, multiple instances of the text segment (e.g., second-language text segment 710a shown in FIG. 7) may be included in second-language documents 106a-106n. For example, second-language document 106a may include multiple instances of the text segment. In another example, second-language documents 106a and 106n may each include one or more instances of the text segment. In any case, the received suggested edit (e.g., suggested edit 1104) may be associated with each instance of the text segment that is present in content database 202.

Furthermore, in an embodiment, step 1212 of flowchart 1200 in FIG. 12 may include step 1802 shown in FIG. 18. In step 1802, each instance of the segment of second-language text in the one or more second-language documents containing an instance of the segment is enabled to be displayed as modified according to the suggested edit. For example, in an embodiment, suggestion approver module 314 in FIG. 3 may be configured to perform step 1802. Referring to FIG. 11, the suggested edit may be associated with multiple instances of the text segment (e.g., second-language text segment 710a shown in FIG. 7) included in second-language documents 106a-106n. If the suggested edit is approved by a user viewing any one of second-language documents 106a-106n that includes the text segment, each of second-language documents 106a-106n that includes the text segment may be enabled to be displayed as modified (e.g., at render time) according to the suggested edit, or each of second-language documents 106a-106n may actually be revised according to the suggested edit.

Various techniques may be used to track multiple instances of a text segment in content database 202. For example, a unique identifier may be assigned to each unique text segment. FIG. 19 shows a flowchart 1900 for assigning identifiers and processing suggested edits according to assigned identifiers, according to an example embodiment. Other structural and operational embodiments will be apparent to persons skilled in the relevant art(s) based on the discussion regarding flowchart 1900. Flowchart 1900 is described as follows.

In step 1902, a plurality of identifiers is generated, each identifier being associated with each instance of a corresponding segment of first-language text that is present in at least one of the plurality of first-language documents. For example, FIG. 20 shows a system 2000 for assigning identifiers, according to an embodiment. As shown in FIG. 20, system 2000 includes a document pre-processor 2002. Document pre-processor 2002 may be configured to generate a plurality of identifiers 2006. For instance, in the example of FIG. 20, document pre-processor 2002 may generate a plurality of identifiers 2006a-2006n.

Document pre-processor 2002 shown in FIG. 20 is configured to pre-process a plurality of first-language documents, including first-language document 604. As shown in FIG. 20, document pre-processor 2002 receives first-language document 604. Document pre-processor 2002 is configured to assign an identifier 2006 to each of first-language text segments 608a-608n of first-language document 604, to generate a first-language document 2004 (having identifiers). First-language document 2004 includes a plurality of identifiers 2006a-2006n, with each identifier 2006 associated with a corresponding text segment 608. For instance, in the example of FIG. 20, text segments 608a-608n are different from each other (do not include identical text), so each of text segments 608a-608n receives a corresponding one of identifiers 2006a-2006n. If any of text segments 608a-608n are the same (include identical text), the text segments 608 that are the same receive the same identifier 2006. For example, if text segment 608b and text segment 608f are the same, they may both be assigned identifier 2006b.

Document pre-processor 2002 may process a plurality of first-language documents (e.g., first-language documents 604a-604n) in a similar manner as described above for first-language document 604 to generate a plurality of pre-processed first-language documents (e.g., first-language documents 2004a-2004n). Identifiers are assigned to the text segments included in the plurality of first-language documents. If any text segments 608 in different first-language documents are the same, the text segments 608 that are the same receive the same identifier 2006. For example, if a text segment 608e in a first-language document 604g and a text segment 608j in a first-language document 604m are the same, they may both be assigned identifier 2006h, for instance. Note that the plurality of first-language documents 2004 generated by document pre-processor 2002 may be stored in content database 202 (as first-language documents 106).

Document pre-processor 2002 may generate identifiers 2006 in any manner. For example, document pre-processor 2002 may receive each text segment 608 of each first-language document 604, and generate a corresponding identifier 2006 by performing a hash algorithm on the text segment 608. For example, document pre-processor 2002 may be configured to perform an MD5 hash of a text segment 608 (e.g., a sentence, a paragraph, etc.) to generate the corresponding identifier 2006. In this manner, each text segment 608 in content database 202 that is the same will be generated the same identifier 2006.

In step 1904, each identifier is associated with each instance of a corresponding segment of second-language text that is present in at least one of the plurality of second-language documents and that is a translated version of the corresponding segment of first-language text. FIG. 21 shows a block diagram of document translator 102 translating first-language document 2004 (which includes identifiers 2006a-2006n), according to an example embodiment. Document translator 102 generates a second-language document 2102, which is a translation of first-language document 2004. For example, document translator 102 may perform a translation of each of text segments 608a-608n of first-language document 2004 to generate second-language document 2102, which includes corresponding second-language text segments 610a-610n. Furthermore, as shown in FIG. 21, identifiers 2006a-2006n assigned to text segments 608a-608n of first-language document 2004 are included in second-language document 2102. Each identifier 2006 is associated with a second-language text segment 610 in second-language document 2102 that is the translated version of the first-language text segment 608 to which the identifier 2006 was associated. For example, if identifier 2006b is assigned to both of first-language text segments 608b and 608f in first-language document 2004, identifier 2006b is also assigned to both of second-language text segments 610*b* and 610*f* in second-language document 2102.

Document translator 102 may translate the plurality of first-language documents 2004 generated by document preprocessor 2002 in this manner, and may store the resulting plurality of second-language documents 2102 in content database 202 (e.g., as second-language documents 106). Identifiers 2006 assigned to second-language text segments 610 in second-language documents 2102 may be used to track text segments in content database 202. In this manner, suggested edits may be associated with multiple instances of a particular text segment.

For example, steps 1906 and 1908 may be performed during step 410 shown in FIG. 4. In step 1906, the identifier associated with the segment of second-language text of the second-language document having the suggested edit is determined. In an embodiment, step 1906 may be performed by suggestion receiver module 312 shown in FIG. 3. When a suggested edit is received, such as suggested edit 1102 shown in FIG. 11, the suggested edit may indicate an identifier 2006 associated with the second-language text segment 610 being edited. Suggestion receiver module 312 may receive the indicated identifier 2006 in the received suggested edit.

In step 1908, the suggested edit is associated with each segment of second-language text associated with the determined identifier in the plurality of second-language documents. In an embodiment, suggestion receiver module 312 may be configured to locate each second-language text segment 610 in content database 202 having the determined identifier 2006. FIG. 22 shows a block diagram of an example of suggestion receiver module 312 associating a suggested edit with multiple instances of a second-language text segment 610, according to an embodiment. Referring to FIG. 22, a user at an electronic device interacts with editor 802 to provide a suggested second-language text segment 2204 as a suggested edit (to replace the current contents of second-language text segment 610*a*). As shown in FIG. 22, second-language text segment 610*a* has identifier 2006*a* associated therewith. A suggested edit 2202 is transmitted from the electronic device, and is received by suggestion receiver module 312, that includes identifier 2006*a* and suggested second-language text segment 2204.

Suggestion receiver module 312 may determine identifier 2006*a* received in suggested edit 2202. Suggestion receiver module 312 may associate suggested edit 2202 with all second-language text segments 610 having identifier 2006*a*. In the example of FIG. 22, first-third second-language documents 2102*a*-2102*c* may be included in content database 202. As shown in FIG. 22, first second-language document 2102*a* includes second-language text segment 610*a* having identifier 2006*a*, that second second-language document 2102*b* includes second-language text segment 610*e* having identifier 2006*a*, and that third second-language document 2102*c* includes second-language text segments 610*p* and 610*q* that each have identifier 2006*a*. Thus, suggestion receiver module 312 may associate suggested second-language text segment 2204 with each of second-language text segment 610*a*, second-language text segment 610*e*, second-language text segment 610*p*, and second-language text segment 610*q*.

Step 1910 may be performed during step 1212 shown in FIG. 12. In step 1910, each segment of second-language text associated with the determined identifier in the plurality of second-language documents is enabled to be displayed as modified according to the suggested edit. In an embodiment, step 1910 may be performed by suggestion approver module 314 shown in FIG. 3. In an embodiment, if approval of a suggested edit is received, suggestion approval module 314 may be configured to locate each second-language text segment 610 in content database 202 having the identifier 2006 corresponding to the approved suggested edit, and to modify each second-language text segment 610 in the corresponding second-language document(s) 2102 according to the suggested edit.

As described above, in an embodiment, the modification to a second-language text segment may be performed immediately after an approval of the suggested edit is received. For example, referring to FIG. 22, suggestion approver module 314 may modify second-language text segment 610*a* in first second-language document 2102*a*, second-language text segment 610*e* in second second-language document 2102*b*, and both of second-language text segments 610*p* and 610*q* in third second-language document 2102*c* according to suggested edit 2202, to generate first-third modified versions of first-third second-language documents 2102*a*-2102*c*.

In another embodiment, rather than modifying second-language documents 2102 in content database 202, each time one of second-language documents 2102 that includes one or more instances of a particular second-language text segment 610 is requested for display, any approved suggested edits associated with the particular second-language text segment 610 may be transmitted to the requesting device along with the one of second-language documents 2102. For instance, in an embodiment, if approval of a suggested edit is received for second-language text segment 610*n*, the approved suggested edit may be associated with identifier 2006*n* of second-language text segment 610*n*. The suggested edit may be stored in content database 202, and may be accessible according to the associated identifier 2006*n*. When a request for a second-language document 2102 that includes an instance of second-language text segment 610*n* is received, the identifier for the instance of second-language text segment 610*n* may be determined to be identifier 2006*n*. Accordingly, content database 202 may be accessed for any suggested edits associated with identifier 2006*n*. The suggested edit(s) associated with identifier 2006*n* may be transmitted to the requesting device along with the second-language document 2102. Second-language text segment 610*n* may be displayed at the device modified according to the suggested edit(s). Thus, in such an embodiment, a suggested edit may be applied to a second-language text segment at render time.

D. Further Example Embodiments

Embodiments described above that provide for storage and display of machine translations and enable users to edit translated content (e.g., in a wiki-like environment for community editing) enable first-language documents to be provided in any number of additional languages. Embodiments described above enable edits to translated text in one document to be propagated across an entire set of content, which may include multiple instances of the translated text desired to be edited. This may be particular beneficial in large content sets.

As described above, user-submitted suggested edits to translations enable improvements to translation quality. For example, a workflow scheme may be configured that allows moderators to review the suggested edits, and to approve or reject them. The approved suggestions are associated with the translated documents, which may be accessed by subsequent users. When any page is rendered in the future that contains text for which the database contains an approved translation suggestion, the approved translation is displayed in place of the original translation of the text.

Approved edits to text (e.g., sentences) in the translation memory may be applied when the edit is received, or when a page containing text that has an approved edit is requested by a user.

Devices in which embodiments may be implemented may include storage, such as storage drives, memory devices, and further types of computer-readable media. Examples of such computer-readable media include a hard disk, a removable magnetic disk, a removable optical disk, flash memory cards, digital video disks, random access memories (RAMs), read only memories (ROM), and the like. As used herein, the terms "computer program medium" and "computer-readable medium" are used to generally refer to the hard disk associated with a hard disk drive, a removable magnetic disk, a removable optical disk (e.g., CDROMs, DVDs, etc.), zip disks, tapes, magnetic storage devices, MEMS (micro-electromechanical systems) storage, nanotechnology-based storage devices, as well as other media such as flash memory cards, digital video discs, RAM devices, ROM devices, and the like. Such computer-readable media may store program modules that include logic for implementing document server 204, document request handler 304, translation editor module 310, suggestion receiver module 312, and suggestion approver module 314, flowchart 400, flowchart 1200, step 1702 in FIG. 17, step 1802 in FIG. 18, flowchart 1900 in FIG. 19, and/or further embodiments of the present invention described herein. Embodiments are directed to computer program products comprising such logic (e.g., in the form of software) stored on any computer useable medium. Such software, when executed in one or more data processing devices, causes a device to operate as described herein.

IV. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method for enabling edits to translated text, comprising:
receiving a first request from a first device for a second-language document stored in a database, the second-language document being a translated version of a first-language document;
transmitting the second-language document to the first device in response to the first request;
enabling a first user at the first device to generate a suggested edit to a segment of second-language text of the second-language document;
receiving the suggested edit from the first device;
associating the received suggested edit with the segment of second-language text of the second-language document stored in the database;
receiving a second request from a second device for the second-language document stored in the database;
transmitting the second-language document to the second device in response to the second request;
enabling a second user at the second device to interact with the segment of second-language text of the second-language document to display the suggested edit, thereby presenting the second user with a selection to accept or reject each of one or more suggested edits;
enabling the second user to approve the displayed suggested edit;
receiving an indication of the approval of the suggested edit from the second device, thereby converting the suggested edit into an accepted edit of the translated version; and
enabling the segment of second-language text of the second-language document to be displayed as modified according to the suggested edit.

2. The method of claim 1, further comprising:
receiving a third request from a third device for the second-language document;
transmitting the second-language document to the third device in response to the third request; and
enabling the segment of second-language text of the second-language document to be displayed at the third device as modified according to the suggested edit.

3. The method of claim 1, wherein said associating the received suggested edit with the segment of second-language text of the second-language document stored in the database comprises:
associating the received suggested edit with a plurality of instances of the segment of second-language text contained in one or more second-language documents stored in the database.

4. The method of claim 3, wherein each of a plurality of second-language documents stored in the database contains at least one instance of the segment of second-language text, wherein said enabling the segment of second-language text of the second-language document to be displayed as modified according to the suggested edit comprises:
enabling each instance of the segment of second-language text to be displayed as modified according to the suggested edit.

5. The method of claim 1, wherein said enabling the segment of second-language text of the second-language document to be displayed as modified according to the suggested edit comprises:
modifying the second-language document stored in the database by revising the segment of second-language text of the second-language document according to the suggested edit.

6. The method of claim 1, wherein said enabling the segment of second-language text of the second-language document to be displayed as modified according to the suggested edit comprises:
enabling the suggested edit to be applied to the segment of second-language text at render time.

7. The method of claim 1, wherein the database stores a plurality of first-language documents, and stores a plurality of second-language documents that are translated versions of the plurality of first-language documents, the method further comprising:
generating a plurality of identifiers;
associating each identifier with each instance of a corresponding segment of first-language text that is present in at least one of the plurality of first-language documents; and
associating each identifier with each instance of a corresponding segment of second-language text that is present in at least one of the plurality of second-language documents and that is a translated version of the corresponding segment of first-language text.

8. The method of claim 7, wherein said enabling the segment of second-language text of the second-language document to be displayed as modified according to the suggested edit comprises:

associating with the suggested edit the identifier that is associated with the instance of the segment of second language text.

9. The method of claim 8, further comprising:
receiving a third request from a third device for a second-language document that includes an instance of the segment of second-language text;
determining the identifier associated with the instance of the segment of second language text;
using the identifier to determine the suggested edit associated with the instance of the segment of second language text; and
enabling the instance of the segment of second-language text to be displayed at the third device as modified according to the determined suggested edit.

10. The method of claim 1, wherein said enabling a first user at the first device to generate a suggested edit to a segment of second-language text of the second-language document comprises:
enabling the segment of second-language text of the second-language document and a corresponding segment of first-language text of the first-language document to be adjacently displayed at the first device.

11. A document server, comprising:
at least one computing device having at least one processor that executes computer executable instructions;
a document request handler configured to receive requests from devices for a second-language document stored in a database, the second-language document being a translated version of a first-language document, the document request handler being configured to transmit the second-language document and one or more suggested edits associated with segments of the second-language document to requesting devices in response to the request, thereby presenting a second user with a selection to accept or reject each of one or more suggested edits;
a suggestion receiver module configured to receive a suggested edit to a segment of second-language text of the second-language document from a first device, the suggested edit generated by a first user at the first device, and to associate the received suggested edit with the segment of second-language text of the second-language document stored in the database; and
a suggestion approver module configured to receive an indication of the approval of the suggested edit from a second device, the approval provided by the second user at the second device, the suggestion approver module configured to convert the suggested edit into an accepted edit of the translated version, and to enable the segment of second-language text of the second-language document to be displayed as modified according to the suggested edit.

12. The document server of claim 11, wherein the suggestion receiver module is configured to associate the received suggested edit with a plurality of instances of the segment of second-language text contained in one or more second-language documents stored in the database.

13. The document server of claim 12, wherein each of a plurality of second-language documents stored in the database contains at least one instance of the segment of second-language text, wherein the suggestion approver module is configured to enable each instance of the segment of second-language text to be displayed as modified according to the suggested edit.

14. The document server of claim 11, wherein the database stores a plurality of first-language documents, and stores a plurality of second-language documents that are translated versions of the plurality of first-language documents, the document server further comprising:
a document pre-processor configured to generate a plurality of identifiers, to associate each identifier with each instance of a corresponding segment of first-language text that is present in at least one of the plurality of first-language documents, and to associate each identifier with each instance of a corresponding segment of second-language text that is present in at least one of the plurality of second-language documents and that is a translated version of the corresponding segment of first-language text.

15. The document server of claim 11, wherein the suggestion receiver module is configured to determine the identifier associated with the segment of second-language text of the second-language document having the suggested edit, and to associate the suggested edit with each segment of second-language text associated with the determined identifier in a plurality of second-language documents stored in the database.

16. The document server of claim 11, wherein the suggestion approver module is configured to revise the segment of second-language text in the second-language document according to the suggested edit to generate a modified second-language document.

17. The document server of claim 11, wherein the suggestion approver module is configured to enable the suggested edit to be applied to the segment of second-language text at render time.

18. A method for enabling edits to translated text, comprising:
receiving a first request from a first device for a second-language document stored in a database, the second-language document being a translated version of a first-language document;
transmitting the second-language document to the first device in response to the first request;
receiving a suggested edit generated by a first user to a segment of second-language text of the second-language document from the first device;
determining an identifier associated with the segment of second-language text of the second-language document having the suggested edit;
associating the suggested edit with each segment of second-language text associated with the determined identifier in a plurality of second-language documents stored in the database, thereby creating a selection for a second device to accept or reject each of one or more suggested edits to the second-language text;
receiving a second request from the second device for one of the plurality of second-language documents stored in the database;
transmitting the one of the plurality of second-language documents to the second device in response to the second request;
receiving an indication of the approval of the suggested edit from the second device provided by a second user at the second device, thereby converting the suggested edit into an accepted edit of the translated version; and
enabling each segment of second-language text associated with the determined identifier in the plurality of second-language documents to be displayed as modified according to the suggested edit.

19. The method of claim 18, further comprising:
receiving a third request from a third device for one of the plurality of second-language documents;

transmitting the one of the plurality of the second-language documents to the third device in response to the third request; and enabling the segment of second-language text of the second-language document to be displayed at the third device as modified according to the suggested edit.

20. The method of claim 18, wherein said enabling each segment of second-language text associated with the determined identifier in the plurality of second-language documents to be displayed as modified according to the suggested edit comprises:

enabling the suggested edit to be applied to each segment of second-language text associated with the determined identifier in the plurality of second-language documents at render time.

* * * * *